(12) United States Patent
Miller

(10) Patent No.: US 11,420,466 B2
(45) Date of Patent: Aug. 23, 2022

(54) CLAD-STYLE VEHICLE WHEEL INCLUDING A VARIABLE HEIGHT RIM

(71) Applicant: Nissan North America, Inc., Franklin, TN (US)

(72) Inventor: Adam Miller, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 752 days.

(21) Appl. No.: 16/145,712

(22) Filed: Sep. 28, 2018

(65) Prior Publication Data

US 2020/0101789 A1    Apr. 2, 2020

(51) Int. Cl.
*B60B 7/06*     (2006.01)
*B60B 21/10*    (2006.01)

(52) U.S. Cl.
CPC ............ *B60B 7/063* (2013.01); *B60B 21/106* (2013.01)

(58) Field of Classification Search
CPC .......... B60B 7/063; B60B 7/18; B60B 7/004; B60B 21/02; B60B 21/106; B60B 21/104; B60B 7/0026; B60B 7/0066; B60B 7/08
See application file for complete search history.

(56) References Cited

U.S. PATENT DOCUMENTS

| | | | | |
|---|---|---|---|---|
| 2,157,960 A | * | 5/1939 | George | B60B 7/14 |
| | | | | 292/76 |
| 3,020,090 A | * | 2/1962 | George | B60B 7/02 |
| | | | | 301/37.35 |
| 3,999,268 A | * | 12/1976 | Jacobs | B21D 53/32 |
| | | | | 29/894.381 |
| 4,991,909 A | * | 2/1991 | Hamada | B60B 7/08 |
| | | | | 301/37.36 |
| 5,188,428 A | * | 2/1993 | Carter, III | B60B 7/10 |
| | | | | 301/37.11 |
| 5,597,213 A | * | 1/1997 | Chase | B60B 7/00 |
| | | | | 301/37.11 |
| 5,664,845 A | * | 9/1997 | Maloney | B60B 7/00 |
| | | | | 301/37.36 |
| 6,637,832 B2 | * | 10/2003 | Wrase | B60B 7/004 |
| | | | | 301/37.11 |
| 7,448,695 B1 | * | 11/2008 | Wolf | B60B 7/004 |
| | | | | 301/37.31 |
| 7,494,192 B2 | * | 2/2009 | Chase | B60B 7/04 |
| | | | | 301/37.43 |
| 2002/0093242 A1 | | 7/2002 | Chase et al. | |
| 2002/0153763 A1 | * | 10/2002 | Van Houten | B60B 7/08 |
| | | | | 301/37.43 |
| 2002/0185908 A1 | | 12/2002 | Woelfel | |
| 2010/0252175 A1 | | 10/2010 | Chase et al. | |
| 2020/0079145 A1 | * | 3/2020 | Wallace | B60B 21/02 |

FOREIGN PATENT DOCUMENTS

DE        3704384 A   *  8/1988  ............... B60B 7/02

* cited by examiner

*Primary Examiner* — Scott A Browne
(74) *Attorney, Agent, or Firm* — Young Basile Hanlon & MacFarlane, P.C.

(57) ABSTRACT

In one aspect of the present disclosure, a vehicle wheel is disclosed that includes a cover and a backbone. The cover includes recessed portions and non-recessed portions defining inner surfaces that are spaced about a periphery of the cover, and the backbone defines at least one first support that is configured and positioned for contact with the inner surfaces defined by the recessed portions and at least one second support that is configured and positioned for contact with the inner surfaces defined by the non-recessed portions.

19 Claims, 18 Drawing Sheets

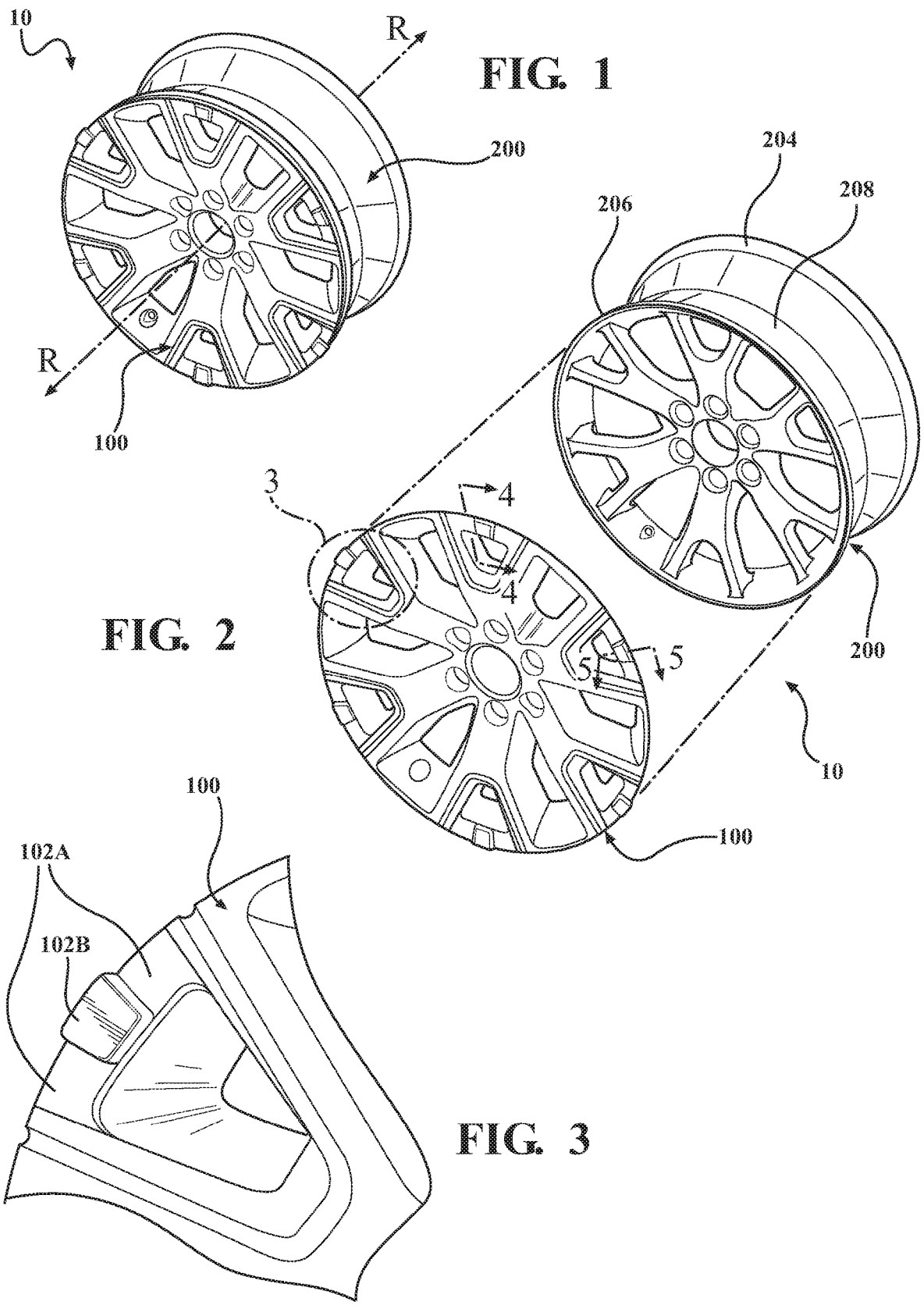

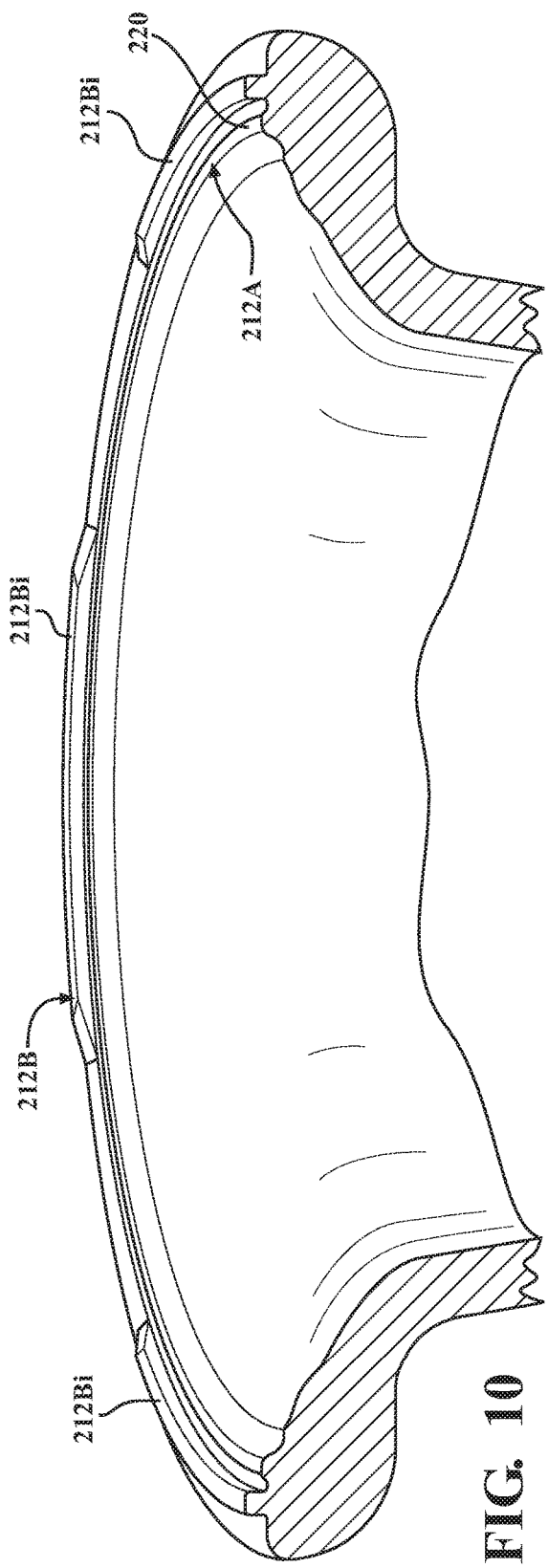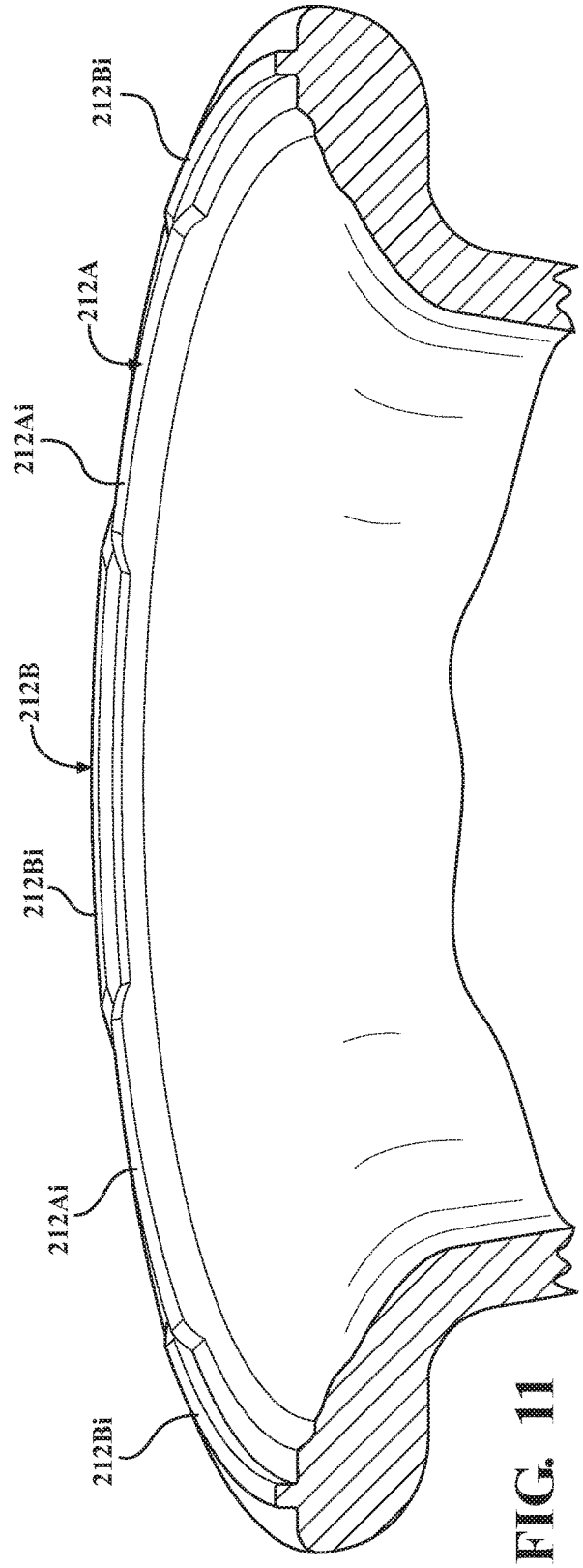
FIG. 10
FIG. 11

1

CLAD-STYLE VEHICLE WHEEL INCLUDING A VARIABLE HEIGHT RIM

CROSS-REFERENCE TO RELATED APPLICATION(S)

None.

TECHNICAL FIELD

The present disclosure relates to generally to vehicle wheels, and more specifically, to a clad-style vehicle wheel that includes a cover and a backbone.

BACKGROUND

Aesthetic covers are widely used to improve the appearance of vehicle wheels. Typically, such covers are secured to the backbone of the wheel using an adherent, such as a polyurethane foam, epoxy, or the like. To further increase the aesthetic appeal of the wheel, certain covers include fillets, recesses, or other such design features. These design features, however, result in a cover with a non-uniform cross-sectional configuration that includes areas of varying heights which not only define gaps with the underlying backbone, but increase the overall thickness in the area where the cover meets the backbone, detracting from the overall aesthetic appeal of the wheel. The gaps between the cover and the backbone are usually filled manually (e.g., with an adhesive), which adds time, complexity, and cost to the assembly process.

The present disclosure addresses these issues by providing a backbone with a series of structural supports that fill in the gaps between the backbone and the cover and allow for a reduction in overall thickness in the area of the wheel where the cover meets the backbone.

SUMMARY

In one aspect of the present disclosure, a vehicle wheel is disclosed that includes a cover and a backbone. The cover includes recessed portions and non-recessed portions defining inner surfaces that are spaced about a periphery of the cover, and the backbone defines at least one first support that is configured and positioned for contact with the inner surfaces defined by the recessed portions and at least one second support that is configured and positioned for contact with the inner surfaces defined by the non-recessed portions.

In certain embodiments, the cover may be formed from a non-metallic material, and the backbone may be formed from a metallic material.

In certain embodiments, the at least one second support may be positioned radially outward of the at least one first support. Alternatively, the at least one second support may be positioned radially inward of the at least one first support.

In certain embodiments, the at least one first support may be configured as a rib (e.g., an annular rib), and the at least one second support may include a plurality of second supports that are either monolithically formed or formed as discrete structures.

In certain embodiments, the at least one first support (e.g., the rib) and the plurality of second supports may be monolithically formed. Alternatively, the at least one first support and the plurality of second supports may be formed as discrete structures.

In certain embodiments, the at least one first support (e.g., the rib) may define a first height, and the plurality of second supports may each define a second height greater than the first height.

In certain embodiments, the at least one first support (e.g., the rib) may be spaced from the plurality of second supports along an axis of rotation of the vehicle wheel so as to define a gap therebetween.

In another aspect of the present disclosure, a backbone for a vehicle wheel is disclosed that is configured to support a cover. The backbone defines an outer rim that includes at least one first support defining a first height and at least one second support defining a second height different from the first height, wherein the at least one first support and the at least one second support are configured and positioned for contact with the cover.

In certain embodiments, the second height may be greater than the first height.

In certain embodiments, the at least one first support may be configured as a rib, and the at least one second support may include a plurality of second supports.

In certain embodiments, the plurality of second supports may be positioned radially outward of the rib.

In certain embodiments, the plurality of second supports may be formed as discrete structures.

In certain embodiments, the rib may be spaced from the plurality of second supports along an axis of rotation of the backbone so as to define a gap therebetween.

In another aspect of the present disclosure, a method of assembling a vehicle wheel is disclosed that includes positioning a cover adjacent a backbone of the vehicle wheel such that inner surfaces defined by recessed portions of the cover are in contact with a first support extending from an outer rim of the backbone, and inner surfaces defined by non-recessed portions of the cover are in contact with a second support extending from the outer rim, and securing the cover to the backbone.

In certain embodiments, securing the cover to the backbone may include securing the cover to the backbone using an adherent.

In certain embodiments, securing the cover to the backbone may include injecting the adherent into one or more spaces defined between the cover and the backbone.

BRIEF DESCRIPTION OF THE DRAWINGS

According to common practice, the various features of the drawings may not be to scale and may be arbitrarily expanded or reduced for clarity.

FIG. 1 is a side, perspective view of a clad-style vehicle wheel including a backbone and a cover in accordance with the principles of the present disclosure;

FIG. 2 is a side, perspective view of the wheel seen in FIG. 1 with the cover shown separated from the backbone;

FIG. 3 is an enlargement of the area of detail indicated in FIG. 2;

FIG. 10 is a top, perspective, cross-sectional view illustrating an alternate embodiment of the backbone in which the first structural support includes a continuous configuration and the second structural support includes a discontinuous configuration;

FIG. 11 is a top, perspective, cross-sectional view illustrating an alternate embodiment of the backbone in which the first and second structural supports each include a discontinuous configuration;

DETAILED DESCRIPTION

The present disclosure describes a clad-style vehicle wheel that includes a cover and a backbone. The cover includes recessed and non-recessed portions that are braced by corresponding structural supports extending outwardly from a rim of the backbone. The structural supports fill gaps that would otherwise exist between the cover and the backbone to not only increase the structural integrity of the wheel but reduce (if not entirely eliminate) the need to manually fill the gaps with adhesive, as is typically done in the assembly of known clad-style wheels. In addition, through the inclusion of structural supports that are configured in correspondence with the dimensions and positions of the recessed and non-recessed portions of the cover, the overall thickness in the area of the wheel where the cover meets the backbone can be reduced to improve the overall aesthetic appeal of the wheel.

Throughout the following disclosure, the term "radial" (and variations thereof) should be understood as referring to separation or distance measured along a radius of the presently disclosed wheel (i.e., separation or distance along an axis that is perpendicular to the axis of rotation of the wheel). Additionally, the terms "thickness" and "height" may be used interchangeably and should be understood as referring to dimensions measured along axes that are parallel in relation to the axis of rotation of the presently disclosed wheel.

With reference to FIGS. 1-5, a clad-style vehicle wheel 10 is disclosed that includes a cover 100 and a backbone 200 that supports the cover 100. In certain embodiments of the disclosure, it is envisioned that the cover 100 and the backbone 200 may be formed from dissimilar materials. For example, the cover 100 may include (e.g., may be formed from) one or more non-metallic materials, such as plastic, and the backbone 200 may include (e.g., may be formed from) one or more metallic materials, such as aluminum. In other embodiments of the disclosure, however, it is envisioned that the cover 100 and the backbone 200 may each be formed from metallic materials, whether identical or non-identical.

Figure 4:
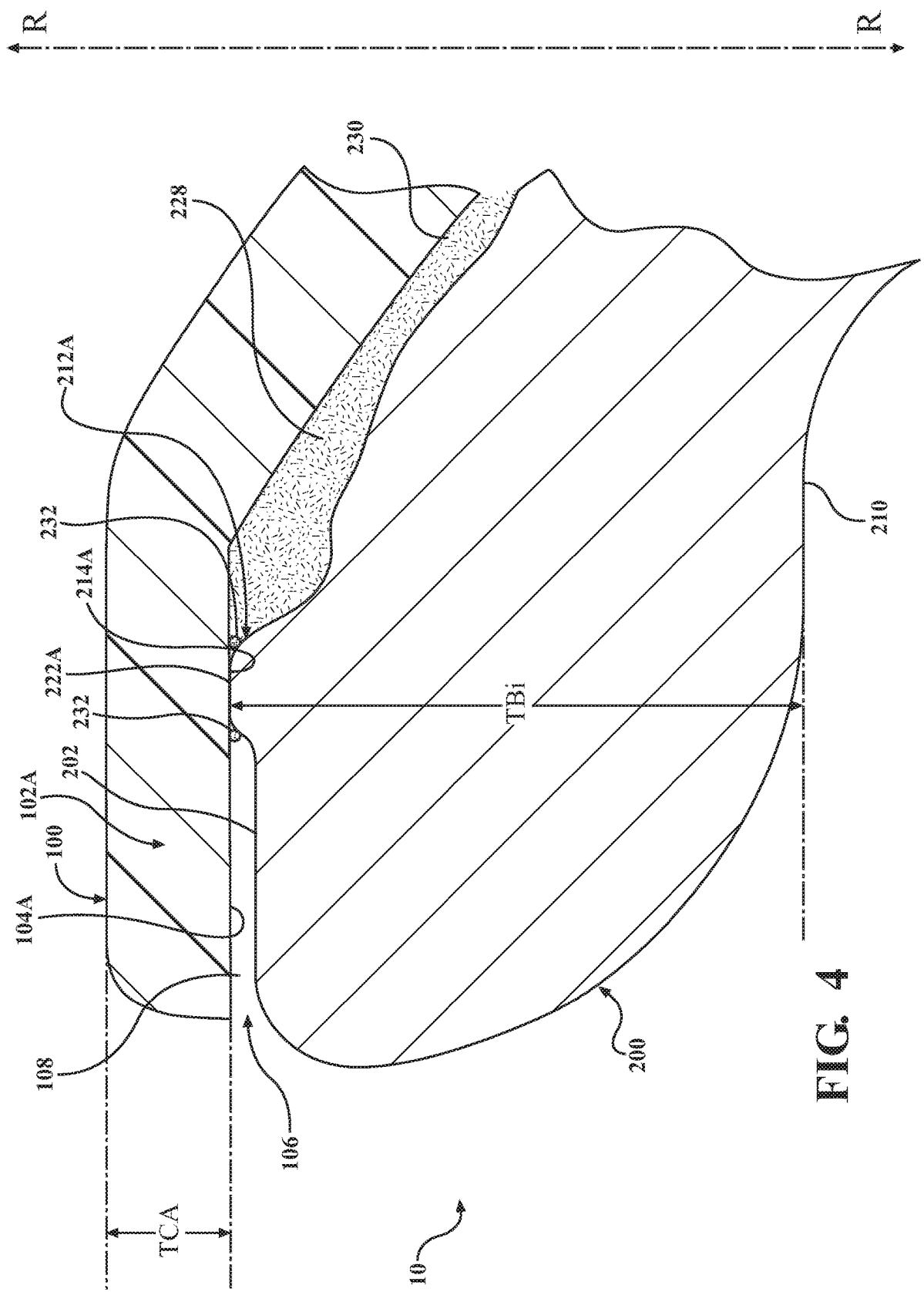
FIG. 4 is a partial, cross-sectional view of the wheel taken along line 4-4 in FIG. 2 through a recessed portion of the cover illustrating a first structural support included on the backbone.
Figure 5:
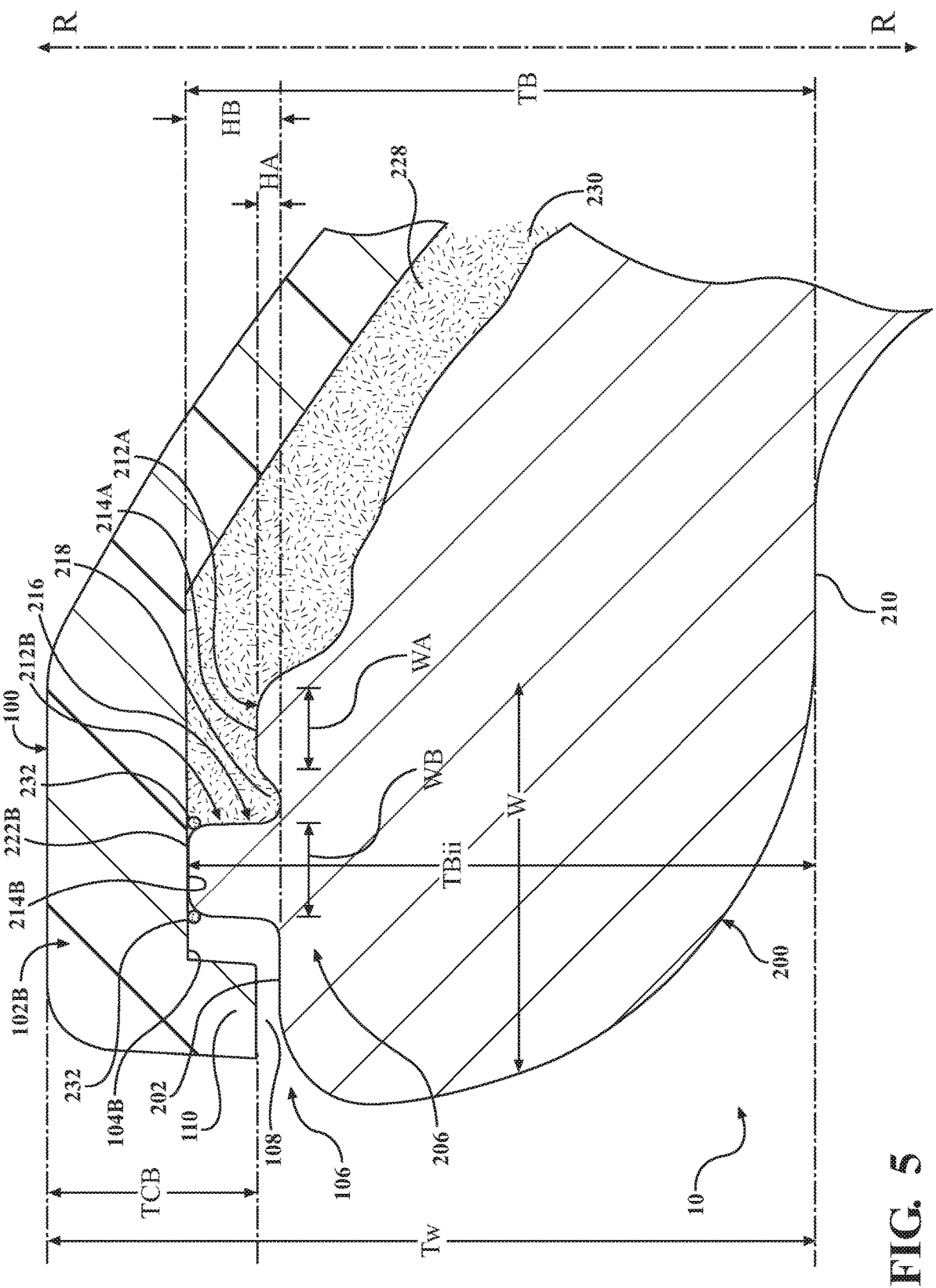
FIG. 5 is a partial, cross-sectional view of the wheel taken along line 5-5 in FIG. 2 through a non-recessed portion of the cover illustrating a second structural support radially separated from the first structural support.

The cover 100 includes a series of recessed portions 102A and non-recessed portions 102B and may be formed through any suitable method of manufacture (e.g., injection molding, casting, 3-D printing, etc.). As seen in FIGS. 3-5, the non-recessed portions 102B extend outwardly relative to the recessed portions 102A to create an irregular, discontinuous configuration about the periphery of the cover 100 (e.g., to increase the overall aesthetic appeal of the wheel 10) that varies in thickness (height). More specifically, at the recessed portions 102A, the cover 100 defines a (first) thickness (height) TCA (FIG. 4) and at the non-recessed portions 102B, the cover 100 defines a (second) thickness (height) TCB (FIG. 5) that is greater than the thickness TCA. In one particular embodiment, it is envisioned that the thickness TCA of the cover 100 at the recessed portions 102A may be approximately 2.5 mm and that the thickness TCB at the non-recessed portions 102B of the cover 100 may be approximately 4.5 mm. It should be appreciated, however, that the respective thicknesses TCA, TCB of the cover 100 at the recessed and non-recessed portions 102A, 102B may be varied in alternate embodiments of the disclosure.

The recessed and non-recessed portions 102A, 102B are spaced about a periphery of the cover 100 and define inner surfaces 104A, 104B (FIGS. 4, 5), respectively. As seen in FIGS. 4 and 5, in certain embodiments, it is envisioned that the cover 100 and the backbone 200 may be configured so as to define a relief 106 (e.g., an annular channel 108) therebetween so as to eliminate rubbing or scraping of the cover 100 against an external surface 202 of the backbone 200 and any noise that may otherwise result from such rubbing or scraping. As seen in FIGS. 4 and 5, the distance between the external surface 202 of the backbone 200 and the inner surfaces 104B defined by the non-recessed portions 102B is greater than the distance between the external surface 202 of the backbone 200 and the inner surfaces 104A defined by the recessed portions 102A. To accommodate for this dimensional difference, at or adjacent to the non-recessed portions 102B, the cover 100 may include a flange 110 that extends towards the backbone 200 such that the dimensions of the relief 106 are uniform about the periphery of the wheel 10.

The backbone 200 includes an inner rim 204 (FIG. 2), an outer rim 206, and a barrel 208 that extends between the rims 204, 206 so as to support a tire (not shown). The outer rim 206 defines a base 210 and includes a series of upstanding structural supports 212 (FIGS. 4, 5) that extend outwardly (in parallel relation to the axis of rotation R of the wheel 10), whereby the outer rim 206 defines an overall thickness TB (FIG. 5) that varies along its width W.

The supports 212 are configured and positioned for contact with the cover 100 to thereby support the cover 100 and facilitate connection to the backbone 200. More specifically, the outer rim 206 includes one or more (first) supports 212A defining (first) outer surfaces 214A that are configured for contact with the inner surfaces 104A defined by the cover 100 at the recessed portions 102A, and one or more (second) supports 212B defining (second) outer surfaces 214B that are configured for contact with the inner surfaces 104B defined by the cover 100 at the non-recessed portions 102B. Depending on the particular configuration of the cover 100, it is envisioned that the outer surfaces 214A, 214B respectively defined by the supports 212A, 212B may be either generally linear in configuration, as seen in FIGS. 4 and 5, or that the outer surfaces 214A, 214B may include an arcuate profile. The support 212A defines a (first) height HA of approximately 0.5 mm and the second support 212B defines a (second) height HB of approximately 2.5 mm such that the backbone defines thicknesses TBi and TBii of approximately 11 mm and 13 mm at the supports 212A and 212B (measured from the base 210), respectively, and the wheel 10 defines an overall thickness TW (FIG. 5) at the area where the cover 100 meets the outer rim 206 of approximately 15.5 mm. It should be appreciated, however, that the particular dimensions of the cover 100, the backbone 200, the supports 212A, 212B, etc., may be varied in alternate embodiments without departing from the scope of the present disclosure.

Figure 6:
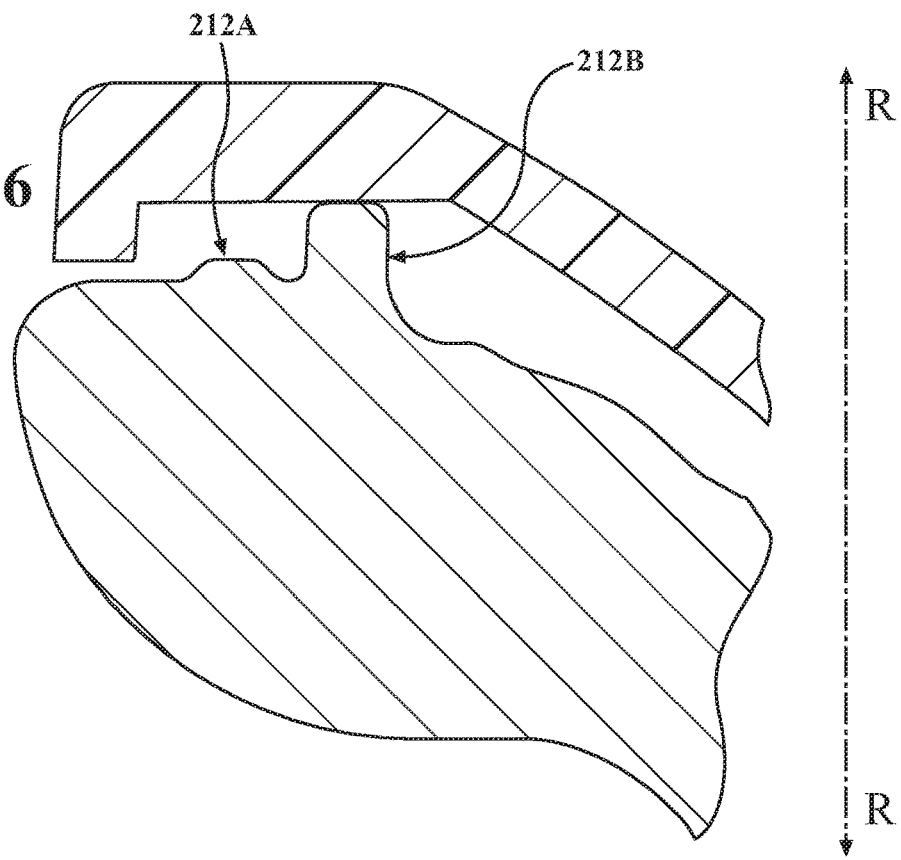
FIG. 6 is a partial, cross-sectional view of the wheel taken through a non-recessed portion of the cover illustrating the first and second structural supports positioned in an alternate configuration.
Figure 7:
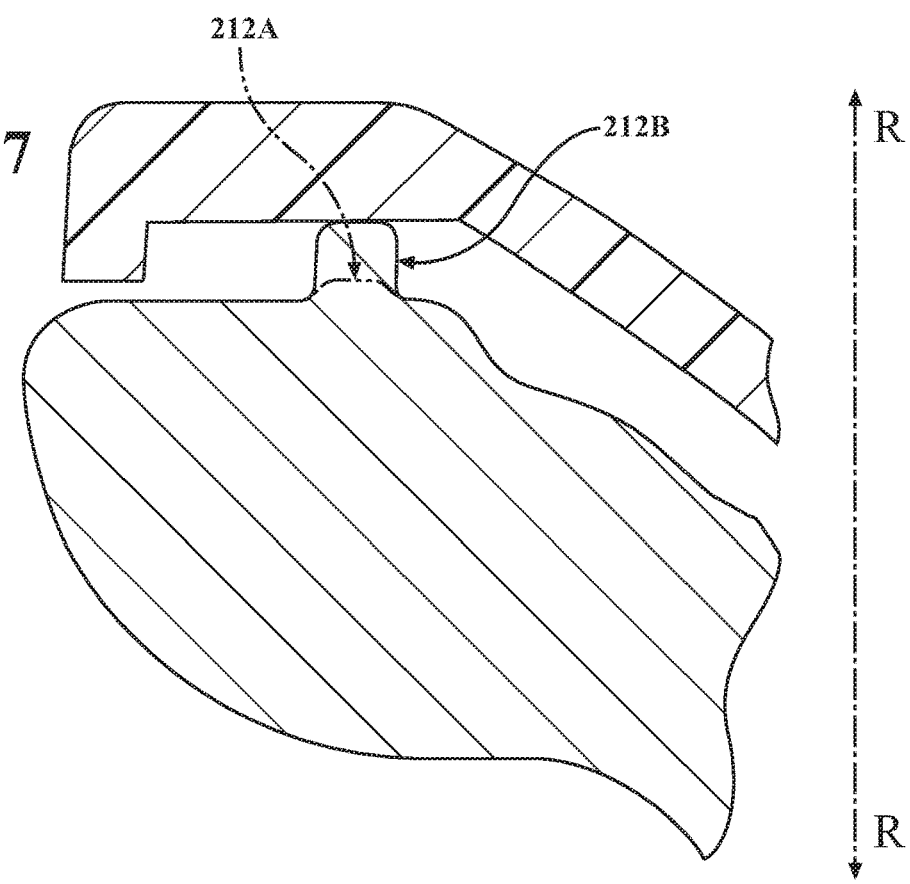
FIG. 7 is a partial, cross-sectional view of the wheel taken through a non-recessed portion of the cover illustrating the first and second structural supports positioned in an alternate configuration in which the first and second supports are generally positioned in radial alignment.

Although the support 212B is shown as being positioned radially outward of the support 214A in the embodiment seen in FIGS. 4 and 5 (i.e., at a greater perpendicular distance from the axis of rotation R of the wheel 10), it should be appreciated that, in alternate embodiments of the disclosure, the relative positions of the supports 212A, 212B may be varied. For example, it is envisioned that the support 212B may be positioned radially inward of the support 212A (i.e., at a lesser perpendicular distance from the axis of rotation R), as seen in FIG. 6, or that the supports 212A, 212B may be generally positioned in radial alignment (i.e., such that the perpendicular distances between the supports 212A, 212B and the axis of rotation R are approximately equal), as seen in FIG. 7. Additionally, although shown as defining generally equivalent (e.g., identical) widths WA, WB (FIG. 5) in the embodiments seen in FIGS. 4-7, it should be appreciated that the respective widths WA, WB defined by the supports 212A, 212B may be varied in alternate embodiments of the disclosure such that the widths WA, WB are unequal (e.g., the width WA may be greater than the width WB, or the width WB may be greater than the width WA).

Figure 8:
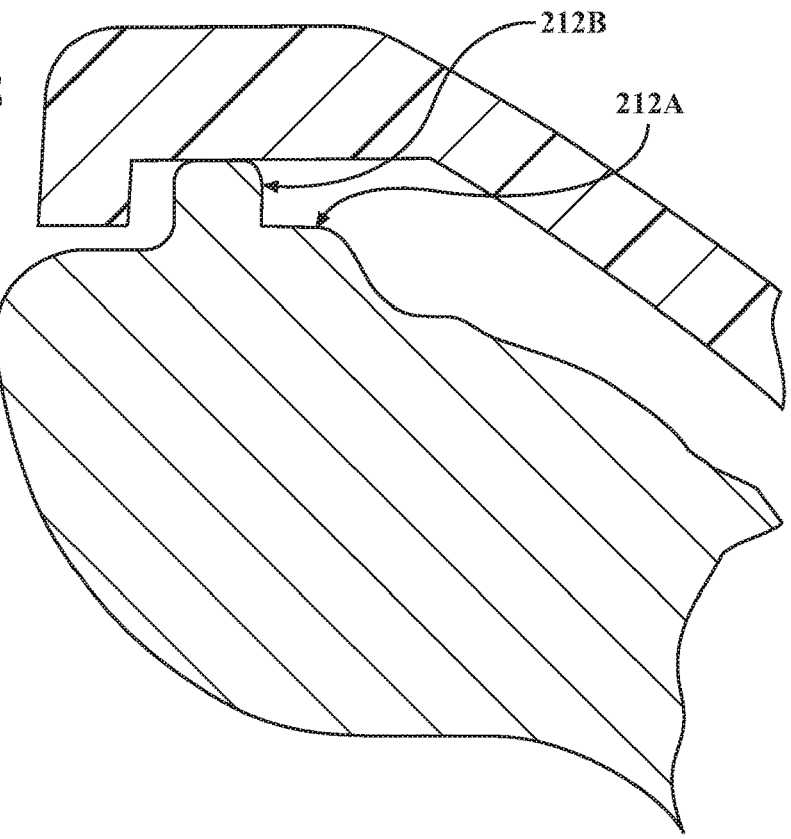
FIG. 8 is a partial, cross-sectional view of the wheel taken through a non-recessed portion of the cover in an alternate embodiment in which the first and second structural supports are integrally formed.
Figure 9:
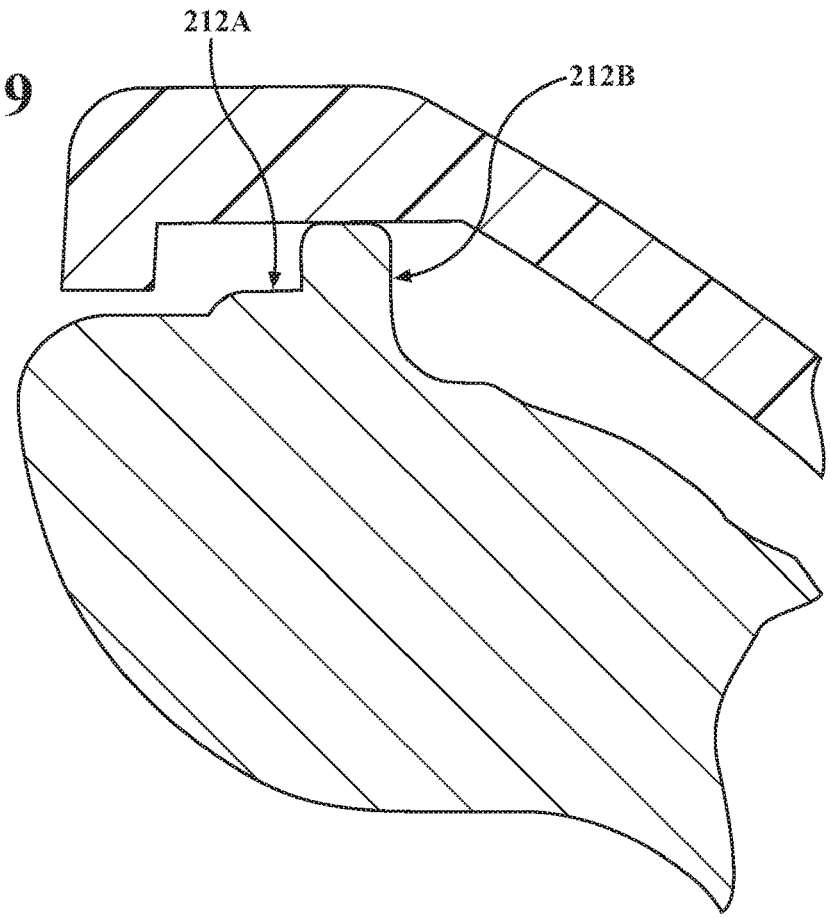
FIG. 9 is a partial, cross-sectional view of the wheel taken through a non-recessed portion of the cover illustrating the first and second structural supports positioned in an alternate configuration.

The supports 212A, 212B may be formed through any suitable manufacturing process. For example, the supports 212A, 212B may be formed during casting of the backbone 200, or through machining via the removal of material from the backbone 200. Additionally, although shown in FIGS. 4 and 5 as discrete structures that define a space 216 (e.g., a groove 218) therebetween, in an alternate embodiment, it is envisioned that the supports 212A, 212B may be integrally (e.g., monolithically) formed so as to eliminate the space 216, as seen in FIGS. 8 and 9, which illustrate the supports 212A being positioned radially inward and radially outward of the supports 212B, respectively.

Depending upon the particular design and configuration of the cover 100, it is envisioned that the supports 212A, 212B may be either continuous or discontinuous structures. For example, FIG. 10 illustrates an embodiment in which the support 212A includes a continuous configuration defining an annular rib 220 and the support 212B includes a discontinuous configuration defining a series of discrete, individual supports 212Bi. It is also envisioned, however, that each of the supports 212A, 212B may include a discontinuous configuration. For example, as seen in FIG. 11, the support 212A may include a series of discrete, individual supports 212Ai and the support 212B may include a series of discrete, individual supports 212Bi. In such embodiments, the individual supports 212Ai, 212Bi may be spaced intermittently about a periphery of the outer rim 206 such that the supports 212Ai and 212Bi are generally offset from each other in accordance with the positions of the recessed and non-recessed portions 102A and 102B (FIGS. 3-5), respectively.

Figure 12:
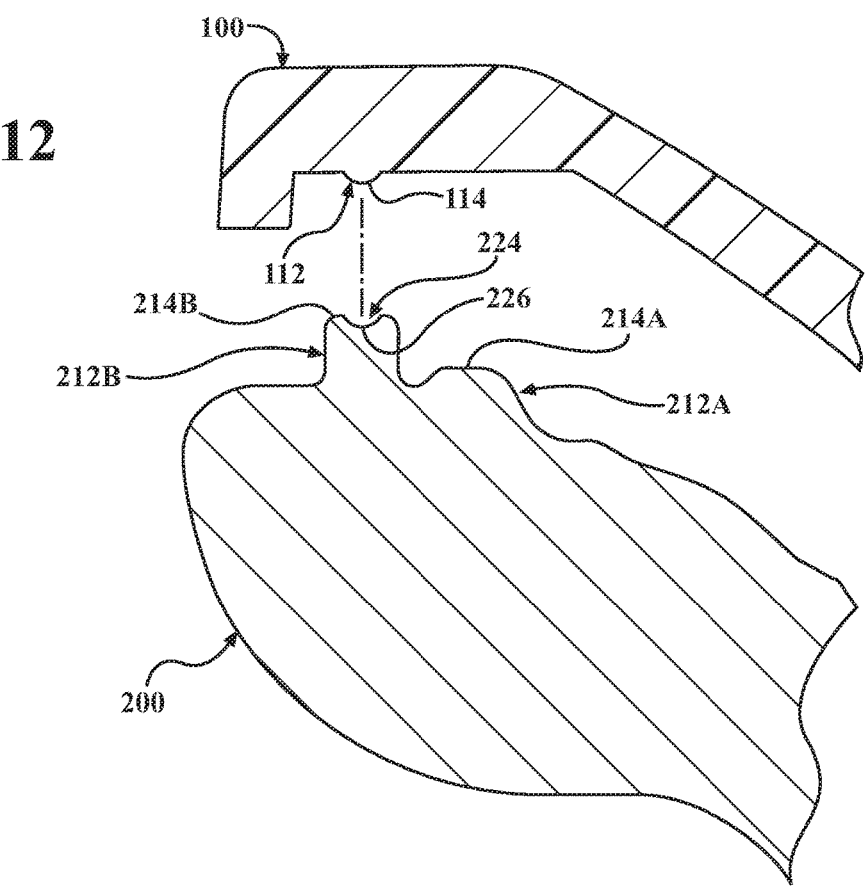
FIG. 12 is a partial, cross-sectional view of the wheel taken through a non-recessed portion of the cover in an alternate embodiment in which the cover and the backbone include corresponding alignment members.

With reference again to FIGS. 1-5, assembly of the vehicle wheel 10 will be discussed. Initially, the cover 100 is oriented such that the recessed and non-recessed portions 102A and 102B are positioned in general alignment with the supports 212A and 212B of the backbone 200, respectively. More specifically, the cover 100 is oriented such that the inner surfaces 104A defined by the recessed portions 102A are in contact with the outer surfaces 214A defined by the first supports 212A at interfaces 222A (FIG. 4), and the inner surfaces 104B defined by the non-recessed portions 102B are in contact with the outer surfaces 214B defined by the second supports 212B at interfaces 222B (FIG. 5). To facilitate proper alignment between the cover 100 and the backbone 200, and assembly of the wheel 10, it is envisioned that the cover 100 and the backbone 200 may include corresponding alignment members 112, 224 (FIG. 12). For example, as seen in FIG. 12, the cover 100 may include one or more detents 114 that are configured for positioning in one or more corresponding recesses 226 defined by the supports 212 (e.g., formed in the outer surface 214A and/or the outer surface 214B).

Thereafter, the cover 100 is secured to the backbone 200 using an adherent 228 (FIGS. 4, 5), which may be any suitable component or compound (e.g., a polyurethane foam, an epoxy, or the like). For example, the adherent 228 may be injected into one or more internal chambers 230 (FIGS. 4, 5) defined between the cover 100 and the backbone 200. Depending, for example, on machining tolerances, it may also be necessary or desirable to utilize an adhesive 232 (or the like) at the interfaces 222A, 222B between the cover 100 and the supports 212A, 212B to further secure the cover 100 to the backbone 200. As seen in FIGS. 4 and 5, the contact between the cover 100 and the supports 212A, 212B at the interfaces 222A, 222B inhibits (if not entirely prevents) leakage of the adherent 228 from the chamber(s) 230, and guards against the presence of adherent 228 on an outer, visible surface of the wheel 10 (FIGS. 1, 2).

Figure 13:
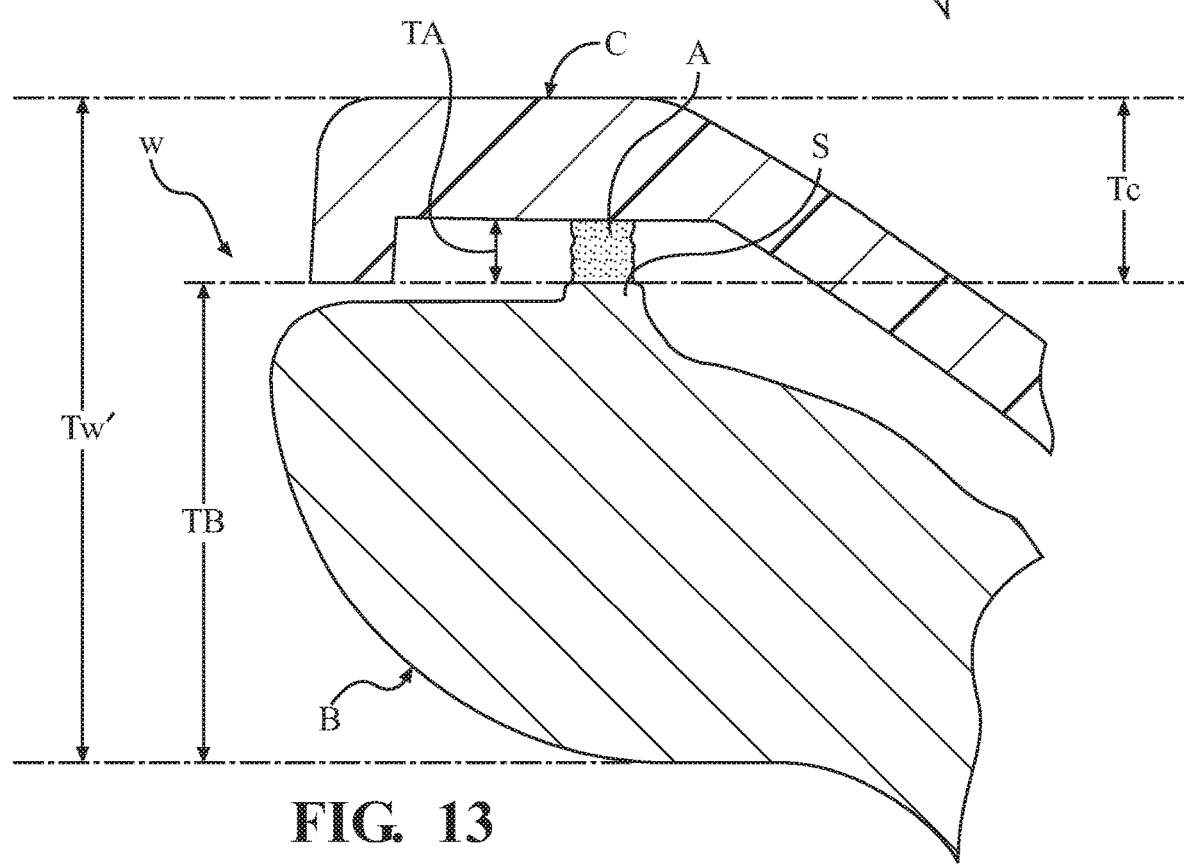
FIG. 13 is a partial, cross-sectional view of a conventional clad-style wheel.

By including multiple supports 212A, 212B of varying heights HA, HB (FIG. 5), respectively, the overall thickness (height) TW of the wheel 10 (FIGS. 1, 2) in the area where the cover 100 meets the outer rim 206 (FIG. 2) can be reduced when compared to conventional technologies. For example, FIG. 13 generally illustrates the construction of a known, clad-style wheel W, which includes a cover C and a backbone B with a single support S. As can be seen in FIG. 13, the wheel W defines an overall thickness (height) TW' that includes the thickness (height) TB of the backbone B at the support S, the thickness (height) TC of the cover C, and the thickness (height) TA of the adhesive A (approximately 2 mm) that is typically applied to the support S to fill in the gap between the backbone B and the cover C. Typically, a minimum benchmark is established for the thickness TB of the backbone (e.g., 13 mm), which would result in an overall thickness TW' of the wheel W of approximately 17.5 mm in the illustrated example, (i.e., a backbone thickness TB of 13 mm plus 2 mm for the thickness TA of the adhesive A plus 2.5 mm for the thickness TC of the cover C). In contrast, in the embodiment of the wheel 10 seen in FIGS. 1-5, for the same benchmark thickness of 13 mm, which is defined at the outer surface 214B (FIG. 5) of the support 212B, the overall thickness TW of the wheel 10 can be reduced to 15.5 mm by eliminating the adhesive A seen in FIG. 13 and filling in the gap between the cover 100 and the backbone 200 with the support 212B instead, thereby saving 2 mm in thickness the illustrated example.

With reference now to FIGS. 14-35, alternate embodiments of the cover 100 and the backbone 200 will be discussed. Each embodiment discussed hereinbelow is substantially similar to the cover 100 and the backbone 200 discussed above, and, accordingly, will only be described with respect to any differences therefrom.

In contrast to the preceding embodiments, in which the supports 212A, 212B are each included on the backbone 200, FIGS. 14-30 illustrate various alternate embodiments in which one or more of the supports 212A, 212B is included on the cover. More specifically, FIGS. 14-23 illustrate an embodiment of the cover and the backbone, respectively identified by the reference characters 300, 400, in which the one of the supports 212A, 212B is included on the cover 300 and the other of the supports 212A, 212B is included on the backbone 400, and FIGS. 24-30 illustrate an embodiment of the cover and the backbone, respectively identified by the reference characters 500, 600, in which both of the supports 212A, 212B are included on the cover 500.

Figure 14:
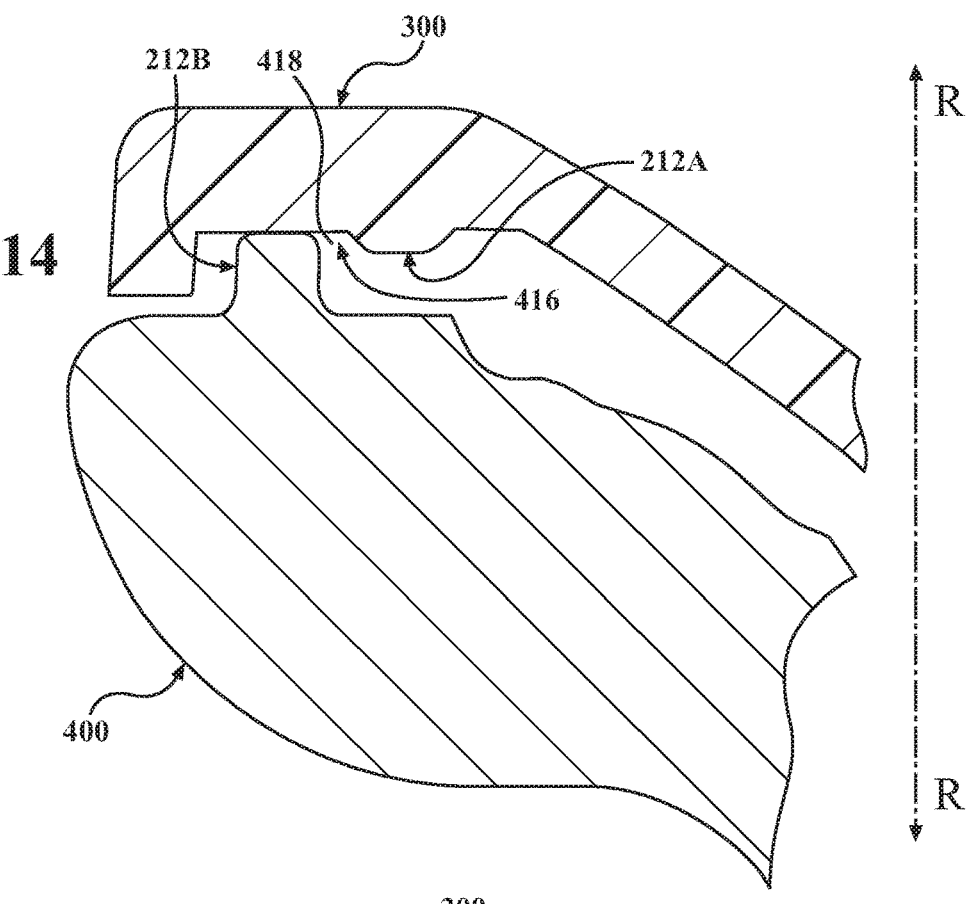
FIG. 14 is a partial, cross-sectional view of the wheel taken through a non-recessed portion of the cover in an alternate embodiment in which the first structural support is included on the cover and the second structural support is included on the backbone and is radially separated from the first structural support.
Figure 15:
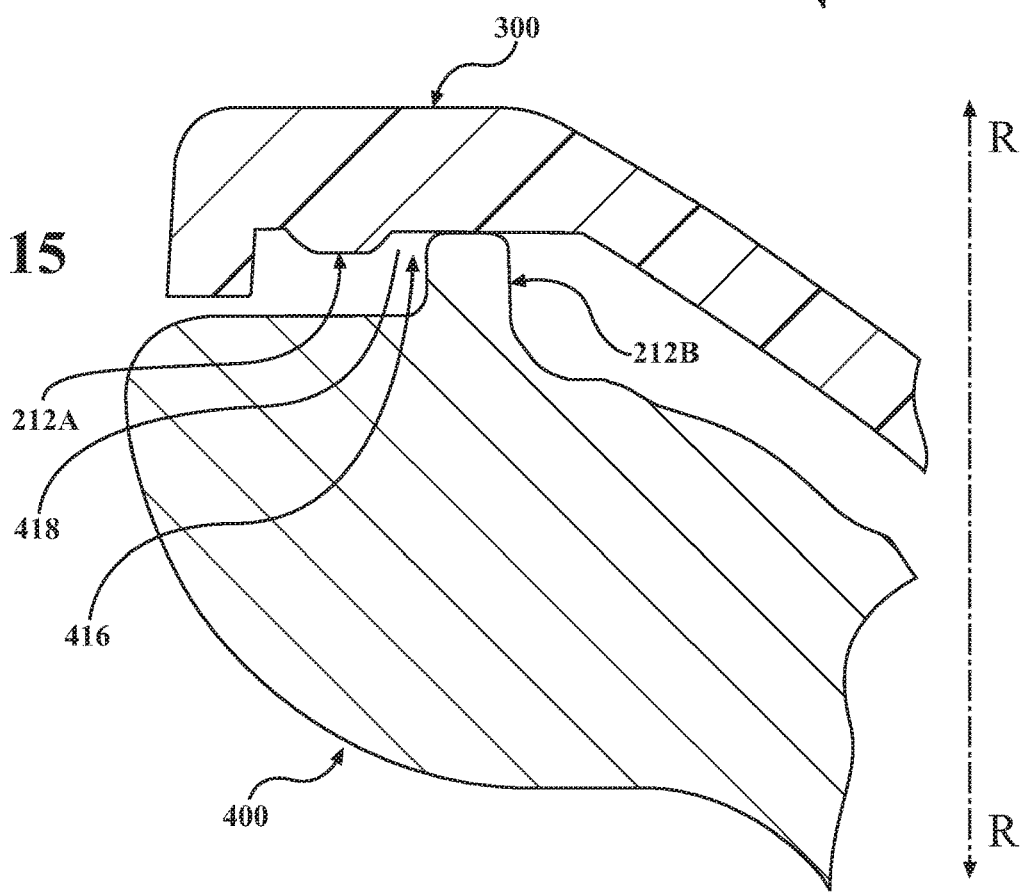
FIG. 15 is a partial, cross-sectional view of the wheel taken through a non-recessed portion of the cover illustrating the first and second structural supports positioned in an alternate configuration.
Figure 16:
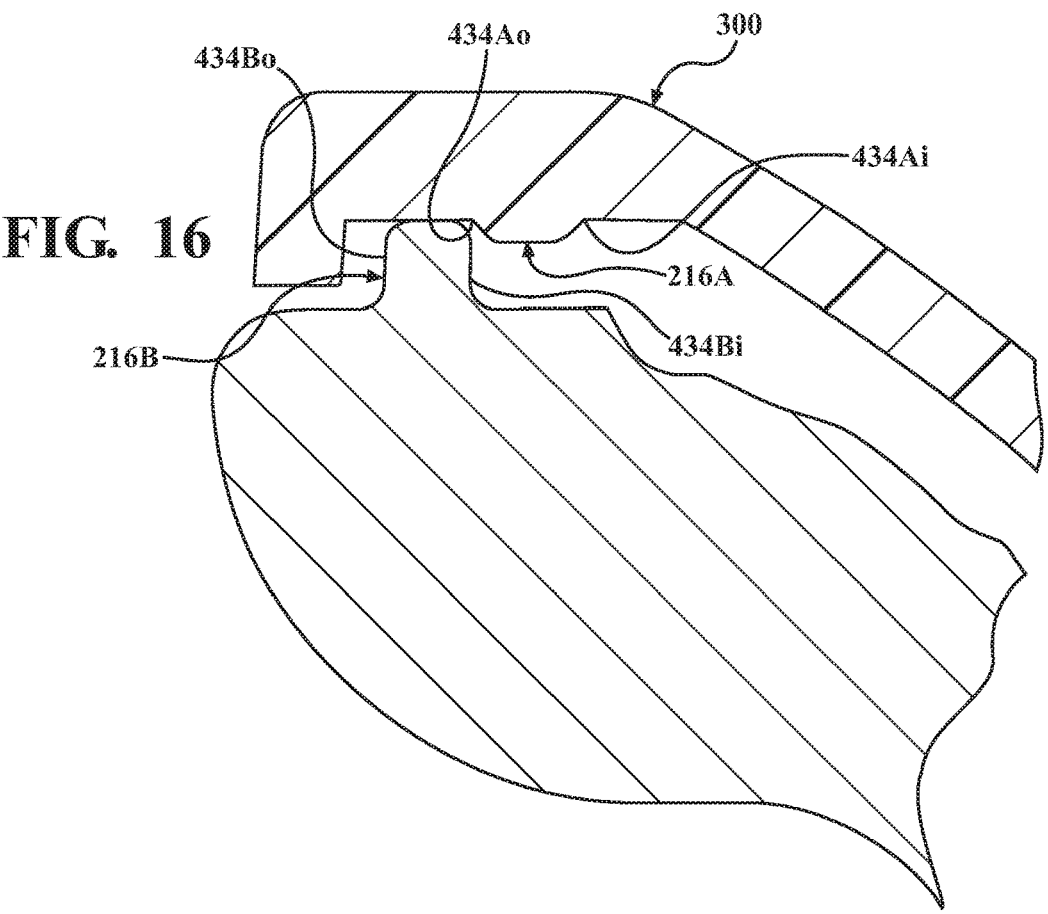
FIG. 16 is a partial, cross-sectional view of the wheel taken through a non-recessed portion of the cover in an alternate embodiment in which the first structural support is included on the cover and the second structural support is included on the backbone so as to eliminate any radial separation therebetween.
Figure 17:
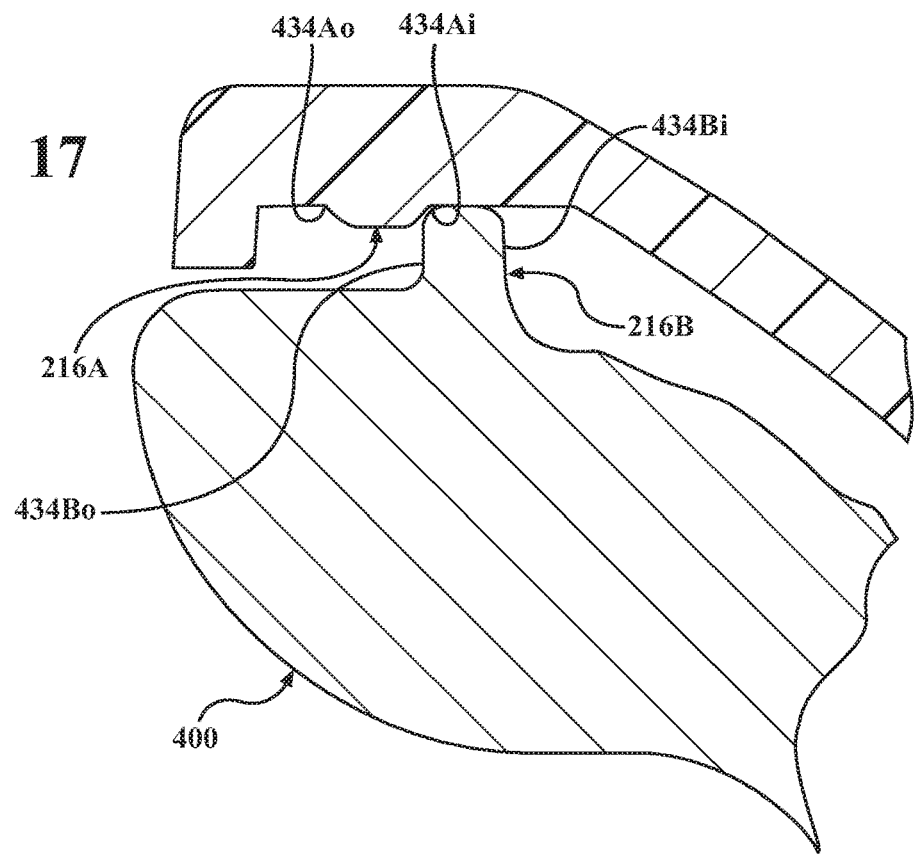
FIG. 17 is a partial, cross-sectional view of the wheel taken through a non-recessed portion of the cover illustrating the first and second structural supports positioned in an alternate configuration.
Figure 18:
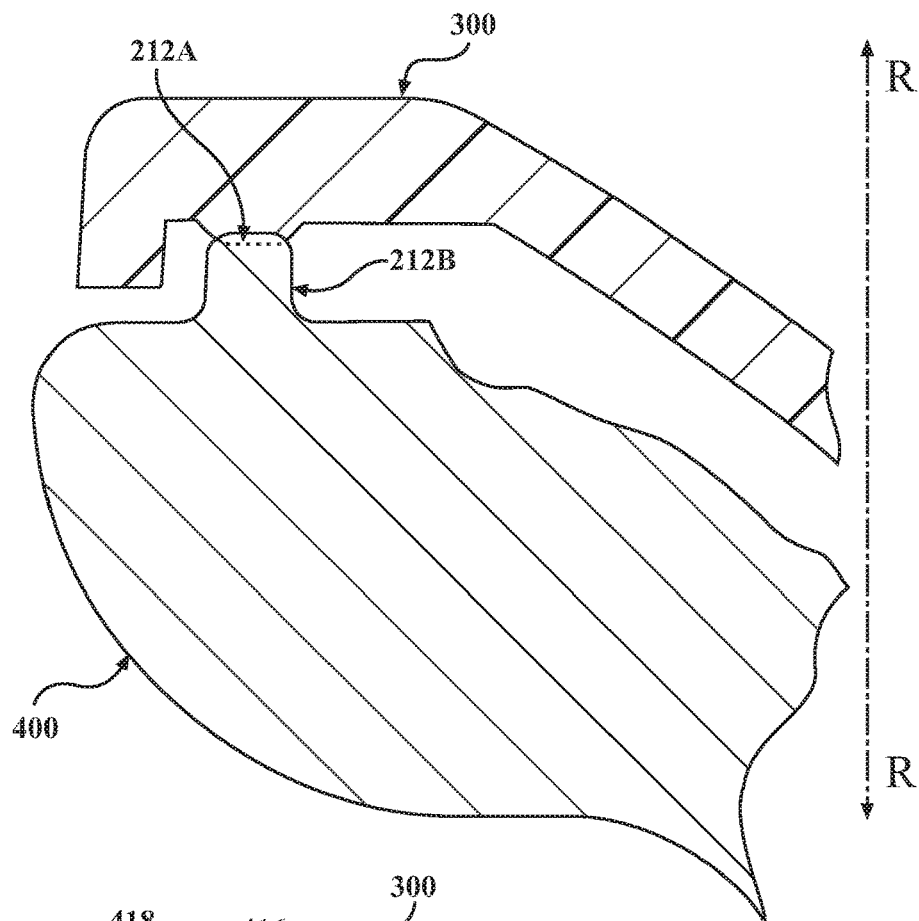
FIG. 18 is a partial, cross-sectional view of the wheel taken through a non-recessed portion of the cover illustrating the first and second structural supports positioned in an alternate configuration in which the first and second supports are generally positioned in radial alignment.

In the embodiment seen in FIG. 14, the support 212A extends from the cover 300 towards the backbone 400, and the support 212B extends from the backbone 400 towards the cover 300. Although the support 212B is shown as being positioned radially outward of the support 212A in the embodiment seen in FIG. 14 (i.e., at a greater perpendicular distance from the axis of rotation R of the wheel 10), alternatively, it is envisioned that the support 212B may be positioned radially inward of the support 212A (i.e., at a lesser perpendicular distance from the axis of rotation R), as seen in FIG. 15. Additionally, although shown as being radially separated so as to define a space 416 therebetween (e.g., a groove 418) in FIGS. 14 and 15, it is also envisioned that the supports 212A, 212B may be positioned so as to eliminate the space 416, as seen in FIGS. 16 and 17, which illustrate the support 212A as being positioned radially inward and radially outward of the support 212B, respectively. More specifically, in the embodiment seen in FIG. 16, the supports 212A, 212B are positioned such that an outer radial edge 434Ao of the support 212A is aligned with an inner radial edge 434Bi of the support 212B, and in the embodiment seen in FIG. 17, the supports 212A, 212B are positioned such that an outer radial edge 434Bo of the support 212B is aligned with an inner radial edge 434Ai of the support 212A. FIG. 18 illustrates another embodiment in which the supports 212A, 212B are generally positioned in radial alignment (i.e., such that the perpendicular distances between the supports 212A, 212B and the axis of rotation R are approximately equal).

Figure 19:
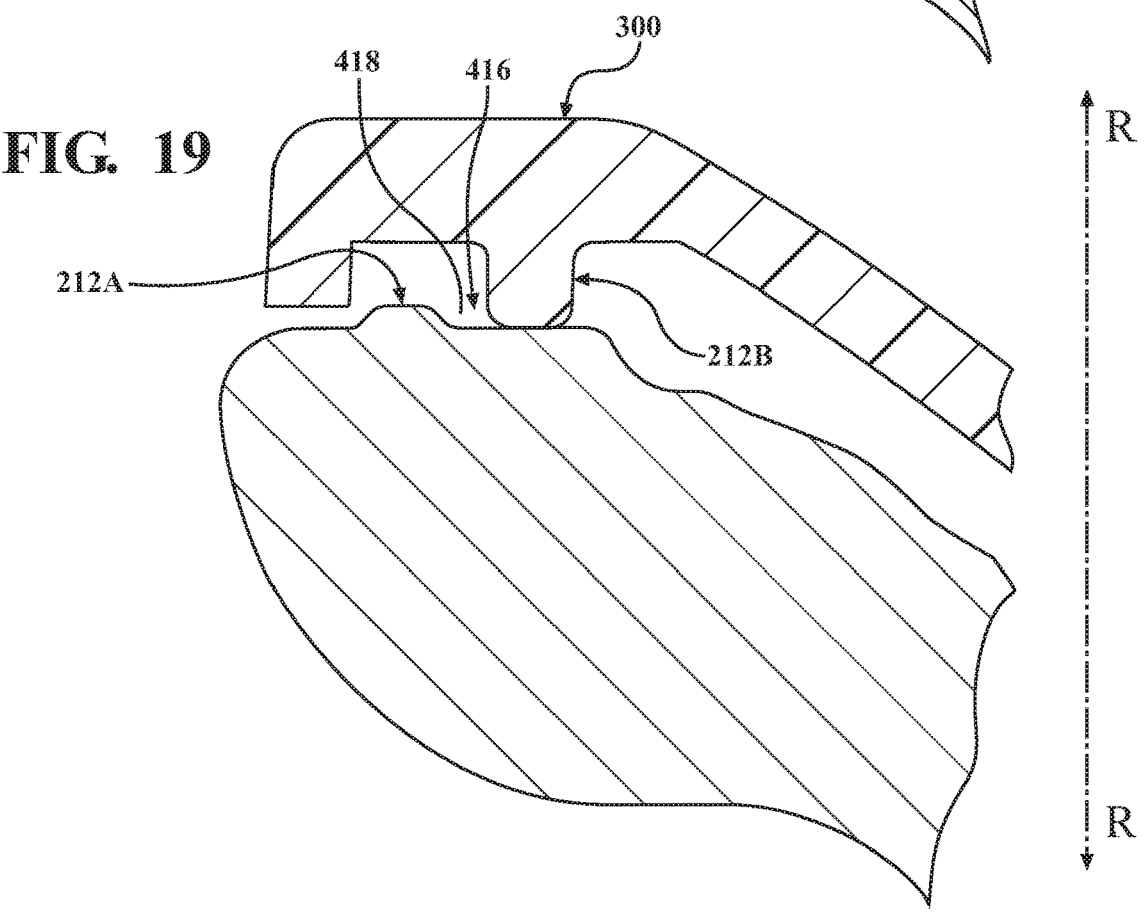
FIG. 19 is a partial, cross-sectional view of the wheel taken through a non-recessed portion of the cover in an alternate embodiment in which the first structural support is included on the backbone and the second structural support is included on the cover and is radially separated from the first structural support.
Figure 20:
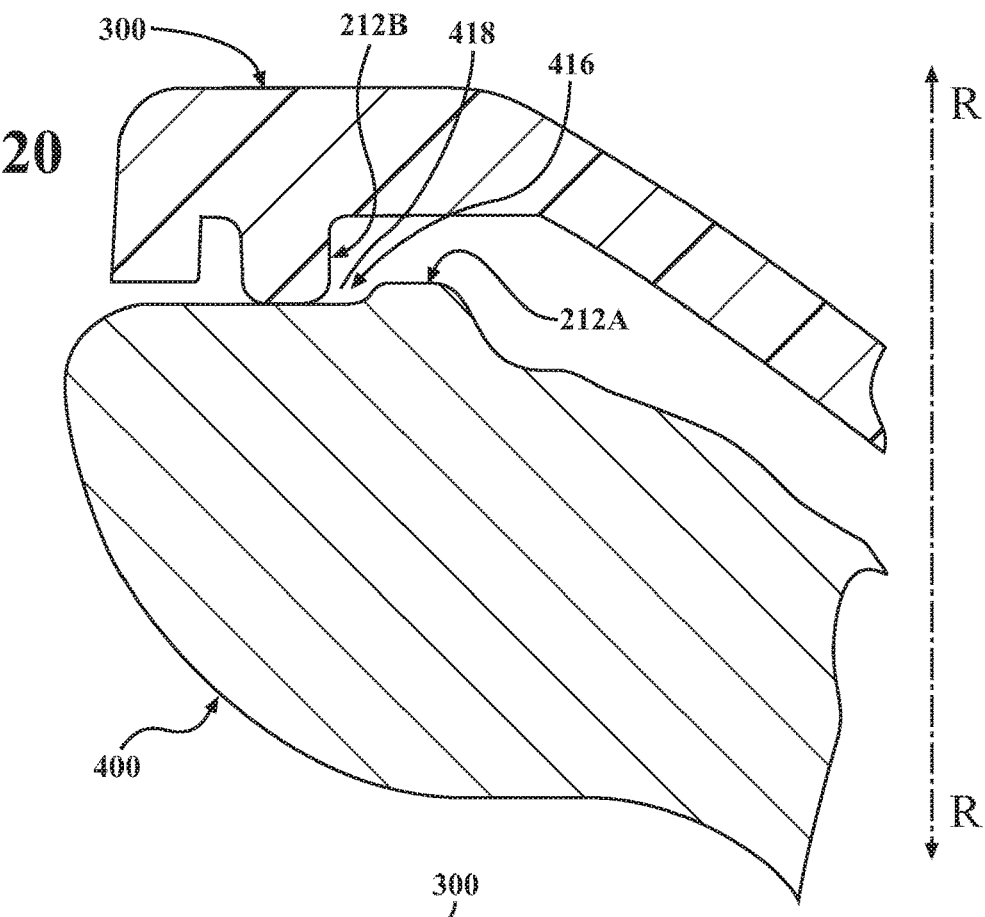
FIG. 20 is a partial, cross-sectional view of the wheel taken through a non-recessed portion of the cover illustrating the first and second structural supports positioned in an alternate configuration.
Figure 21:
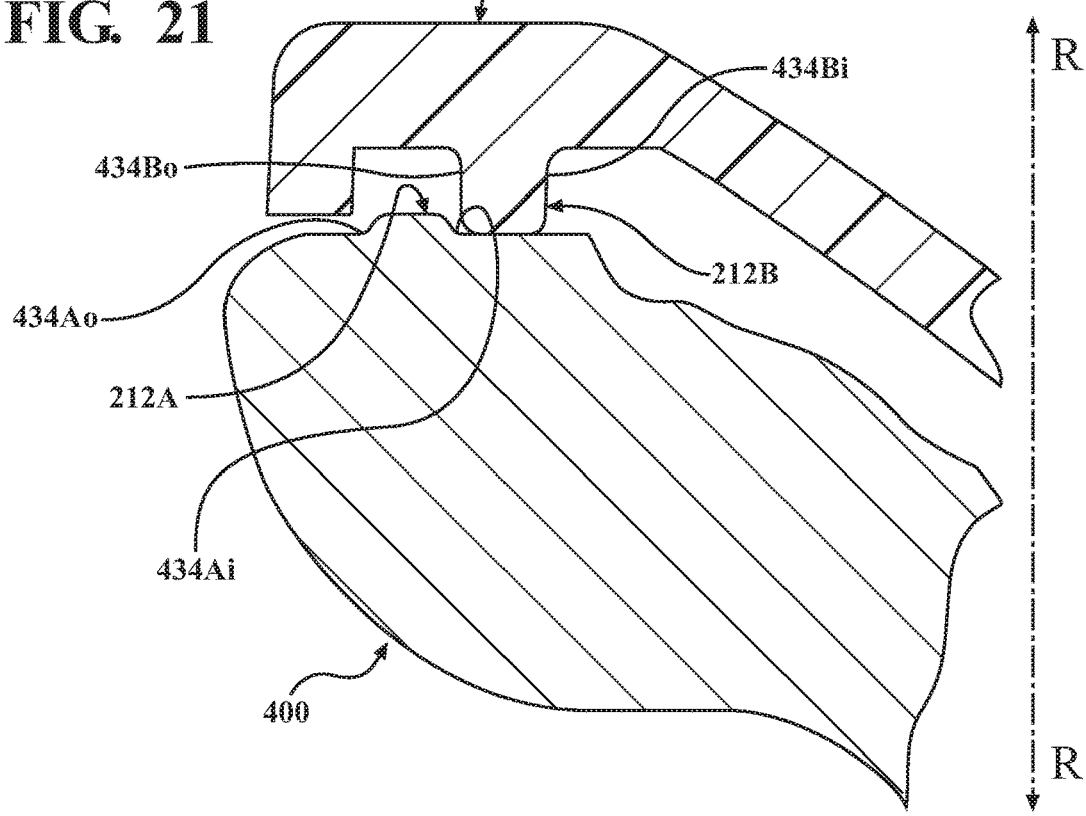
FIG. 21 is a partial, cross-sectional view of the wheel taken through a non-recessed portion of the cover in an alternate embodiment in which the first structural support is included on the backbone and the second structural support is included on the cover so as to eliminate any radial separation therebetween.
Figure 22:
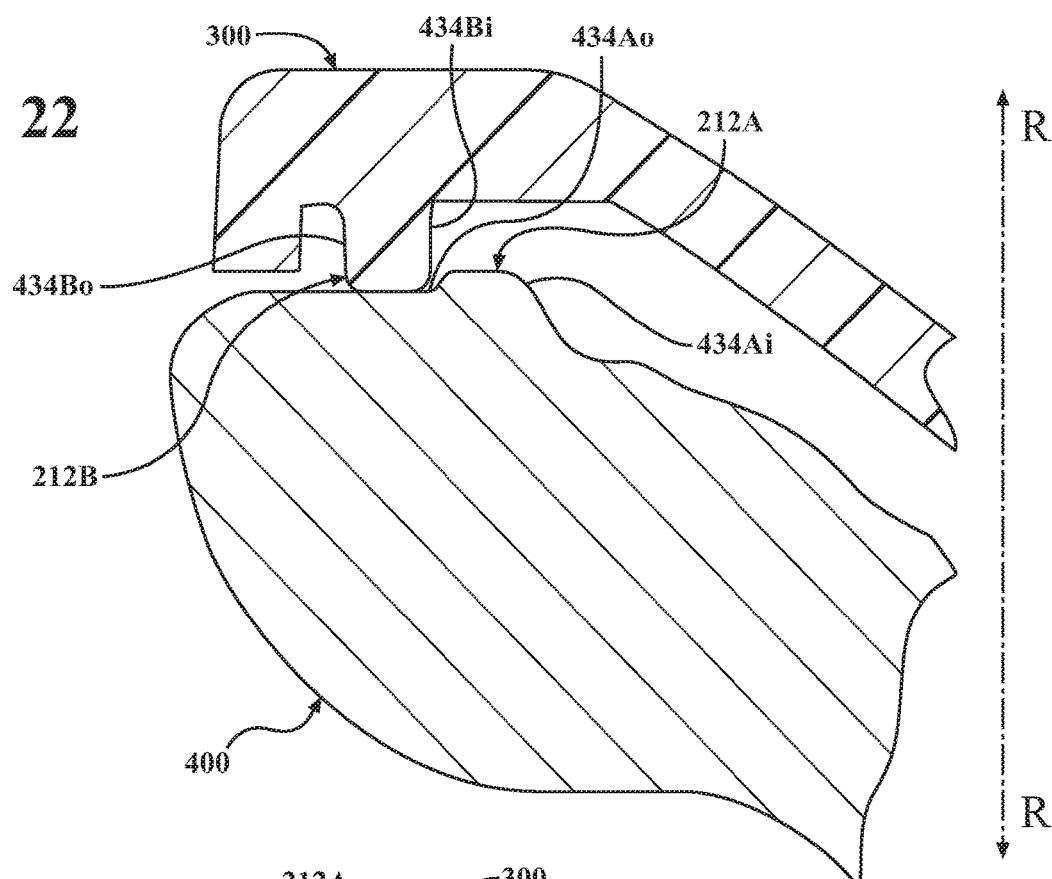
FIG. 22 is a partial, cross-sectional view of the wheel taken through a non-recessed portion of the cover illustrating the first and second structural supports positioned in an alternate configuration.
Figure 23:
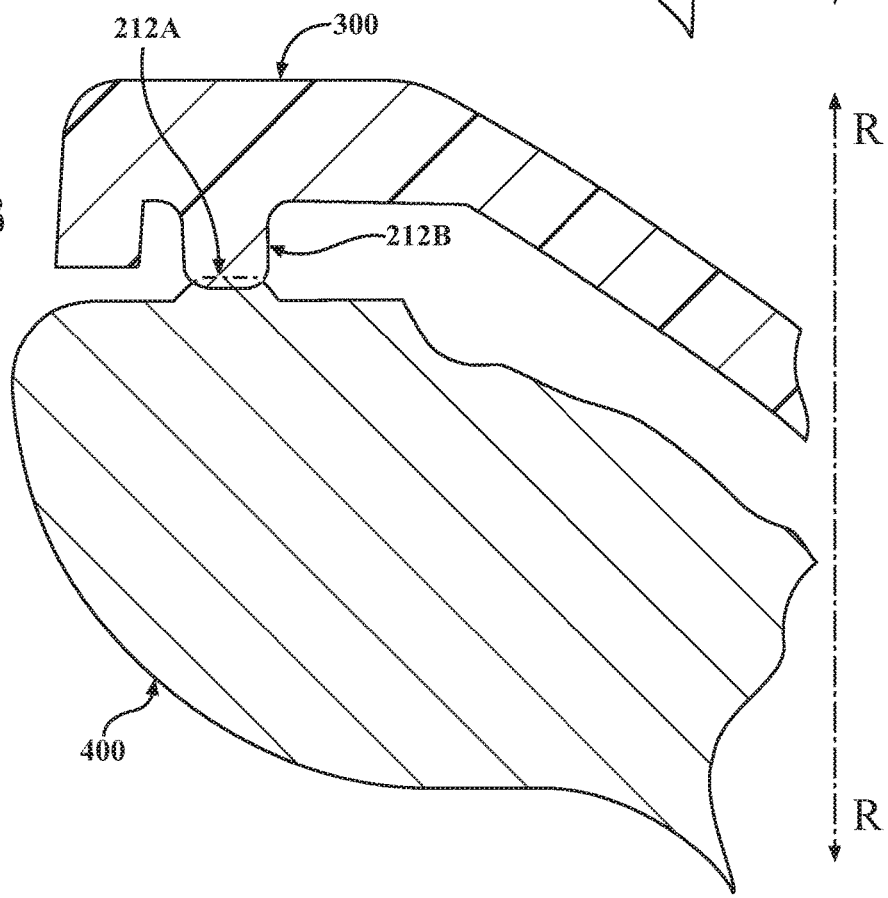
FIG. 23 is a partial, cross-sectional view of the wheel taken through a non-recessed portion of the cover illustrating the first and second structural supports positioned in an alternate configuration in which the first and second supports are generally positioned in radial alignment.

FIG. 19 illustrates another variation in which the support 212A extends from the backbone 400 towards the cover 300 and the support 212B extends from the cover 300 towards the backbone 400. Although the support 212B is shown as being positioned radially inward of the support 212A in the embodiment seen in FIG. 19 (i.e., at a lesser perpendicular distance from the axis of rotation R of the wheel 10), alternatively, it is envisioned that the support 212B may be positioned radially outward of the support 212A (i.e., at a greater perpendicular distance from the axis of rotation R), as seen in FIG. 20. Additionally, although shown as being radially separated so as to define the aforementioned space 416 therebetween, it is also envisioned that the supports 212A, 212B may be positioned so as to eliminate the space 416, as seen in FIGS. 21 and 22, which illustrate the support 212B as being positioned radially inward and radially outward of the support 212A, respectively. More specifically, in the embodiment seen in FIG. 21, the supports 212A, 212B are positioned such that an outer radial edge 434Bo of the support 212B is aligned with an inner radial edge 434Ai of the support 212A, and in the embodiment seen in FIG. 22, the supports 212A, 212B are positioned such that an outer radial edge 434Ao of the support 212A is aligned with an inner radial edge 434Bi of the support 212B. FIG. 23 illustrates another embodiment in which the supports 212A, 212B are generally positioned in radial alignment (i.e., such that the perpendicular distances between the supports 212A, 212B and the axis of rotation R are approximately equal).

Figure 24:
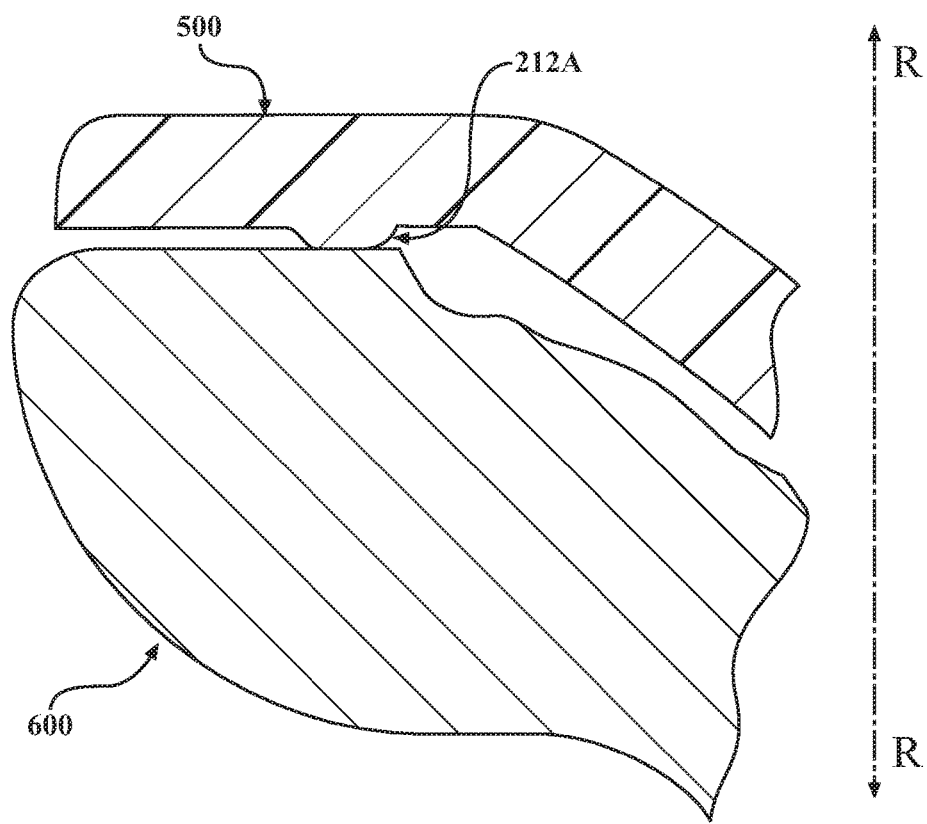
FIG. 24 is a partial, cross-sectional view of the wheel taken through a recessed portion of the cover in an alternate embodiment in which the first and second structural supports are each included on the cover.
Figure 25:
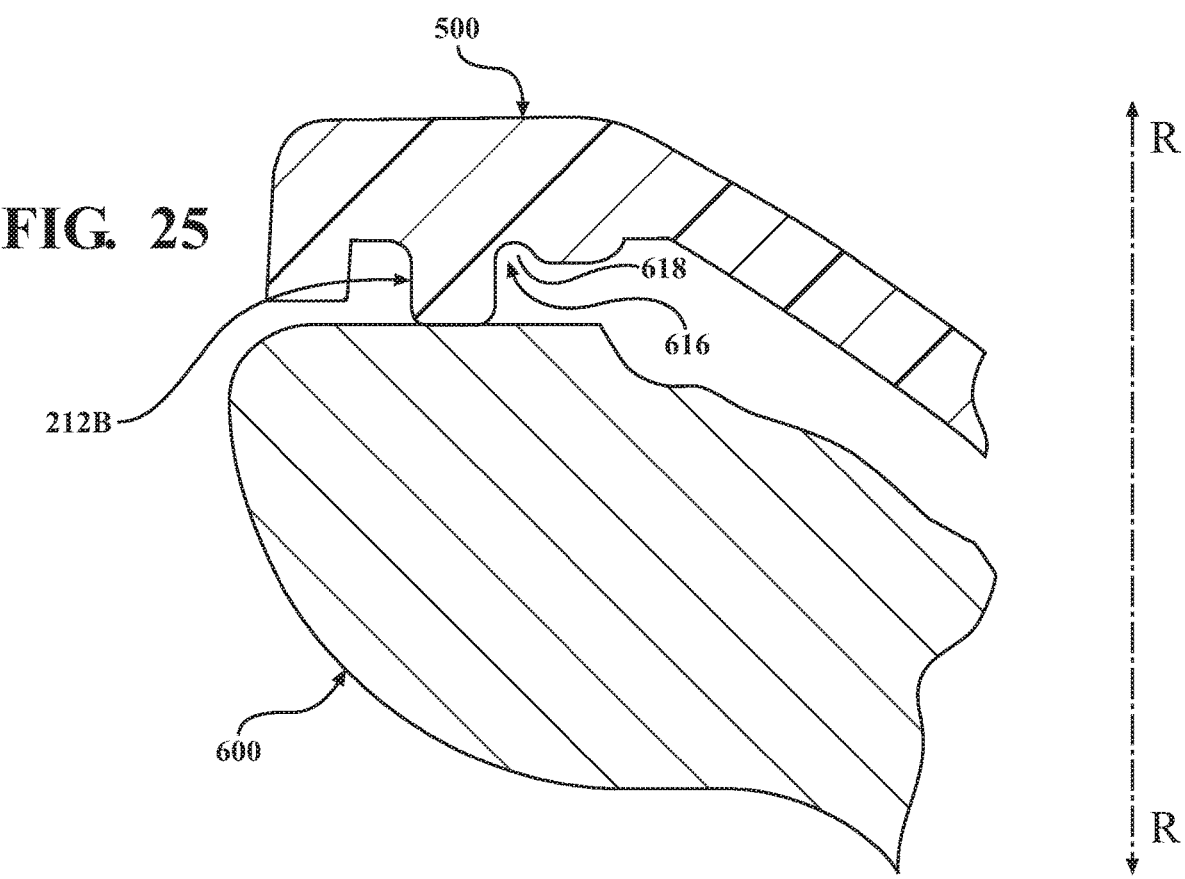
FIG. 25 is a partial, cross-sectional view of the embodiment seen in FIG. 24 taken through a non-recessed portion of the cover and illustrating the first and second structural supports as being radially separated.
Figure 26:
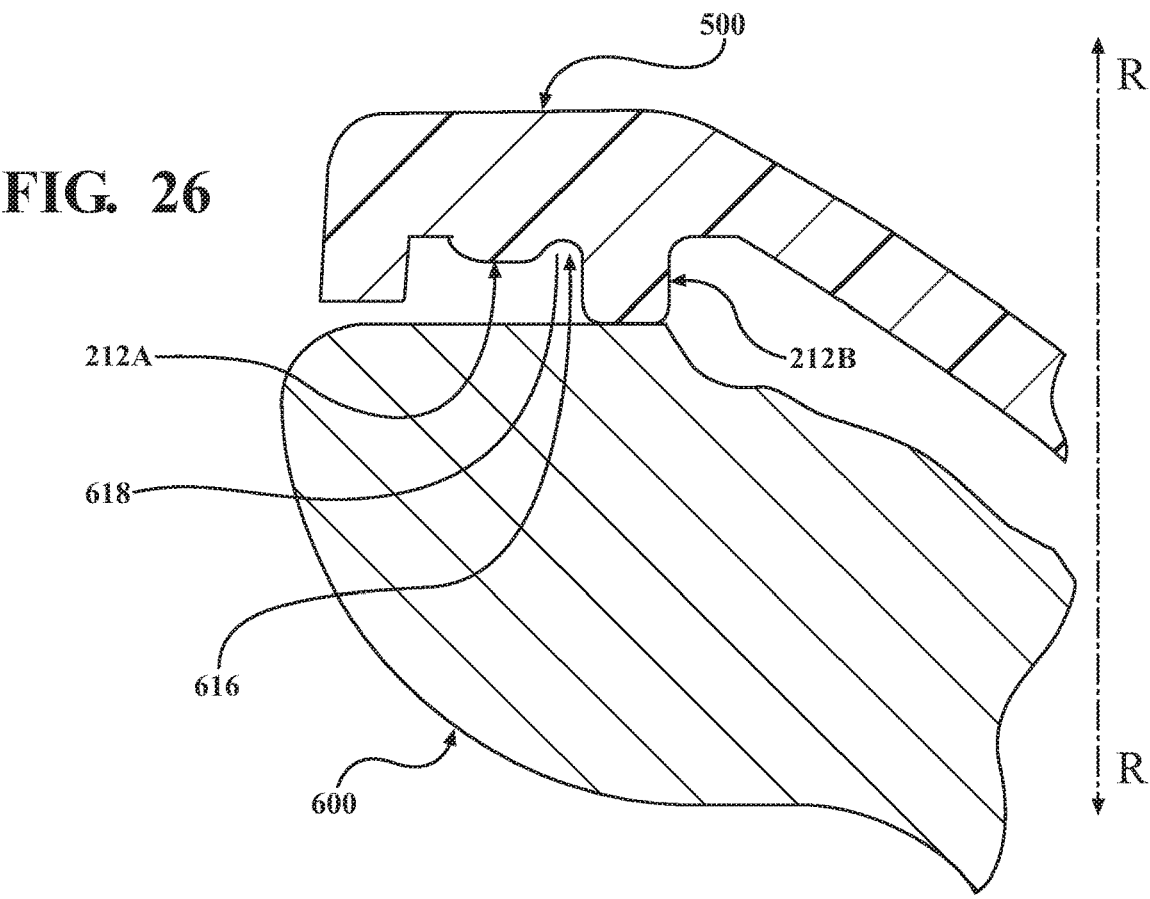
FIG. 26 is a partial, cross-sectional view of the wheel taken through a non-recessed portion of the cover illustrating the first and second structural supports positioned in an alternate configuration.
Figure 27:
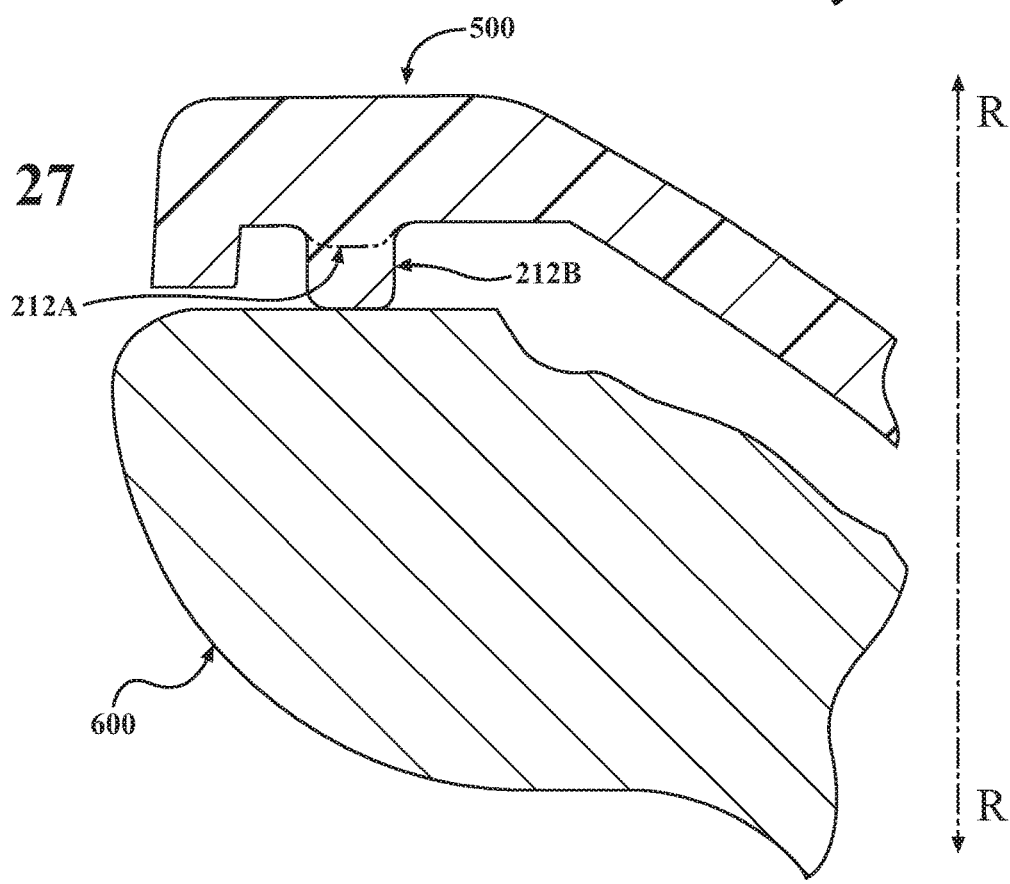
FIG. 27 is a partial, cross-sectional view of the wheel taken through a non-recessed portion of the cover illustrating the first and second structural supports positioned in an alternate configuration in which the first and second supports are generally positioned in radial alignment.

With reference now to FIGS. 24-30, as mentioned above, embodiments of the disclosure are contemplated herein in which both of the supports 212A, 212B are provided on the cover 500. More specifically, FIGS. 24 and 25 illustrate an embodiment in which the support 212B is positioned radially outward of the support 212A (i.e., at a greater perpendicular distance from the axis of rotation R of the wheel 10), whereas FIG. 26 illustrates an embodiment in which the support 212B is positioned radially inward of the support 212A (i.e., at a lesser perpendicular distance from the axis of rotation R), and FIG. 27 illustrates an embodiment in which the supports 212A, 212B are generally positioned in radial alignment (i.e., such that the perpendicular distances between the supports 212A, 212B and the axis of rotation R are approximately equal).

Figure 28:
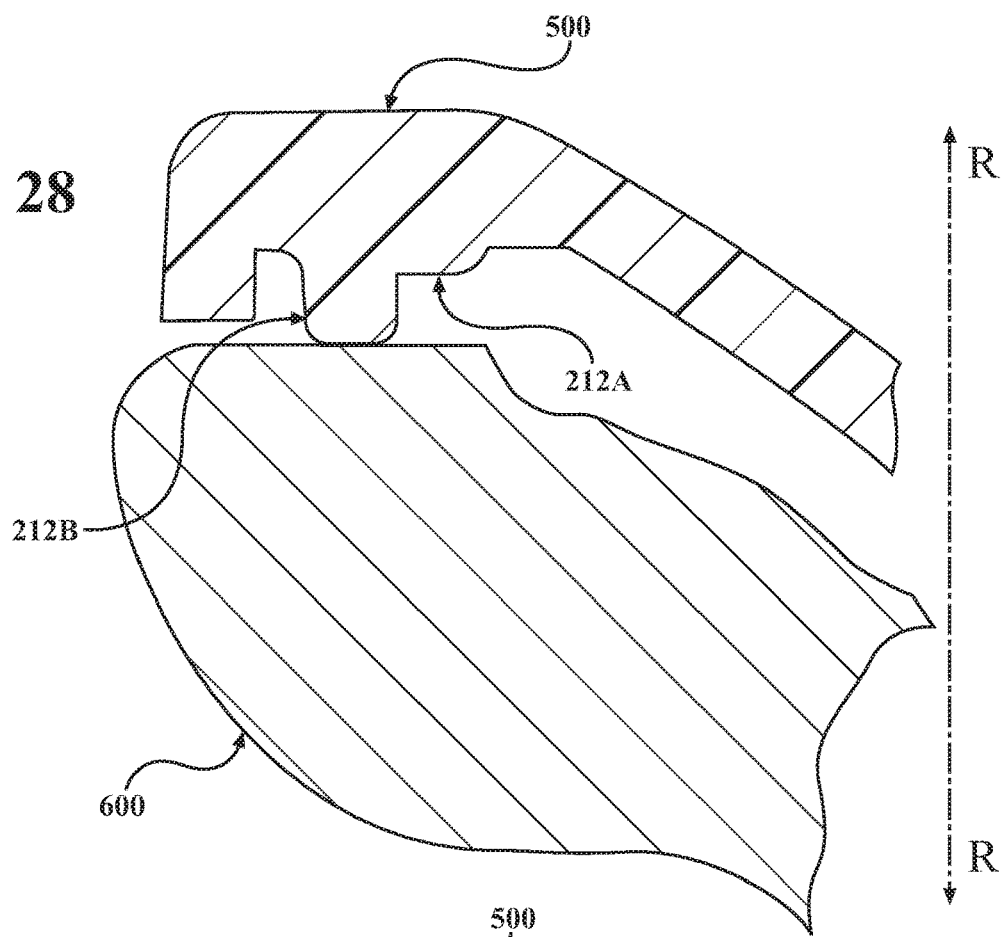
FIG. 28 is a partial, cross-sectional view of the wheel taken through a non-recessed portion of the cover in an alternate embodiment in which the first and second structural supports are integrally formed.
Figure 29:
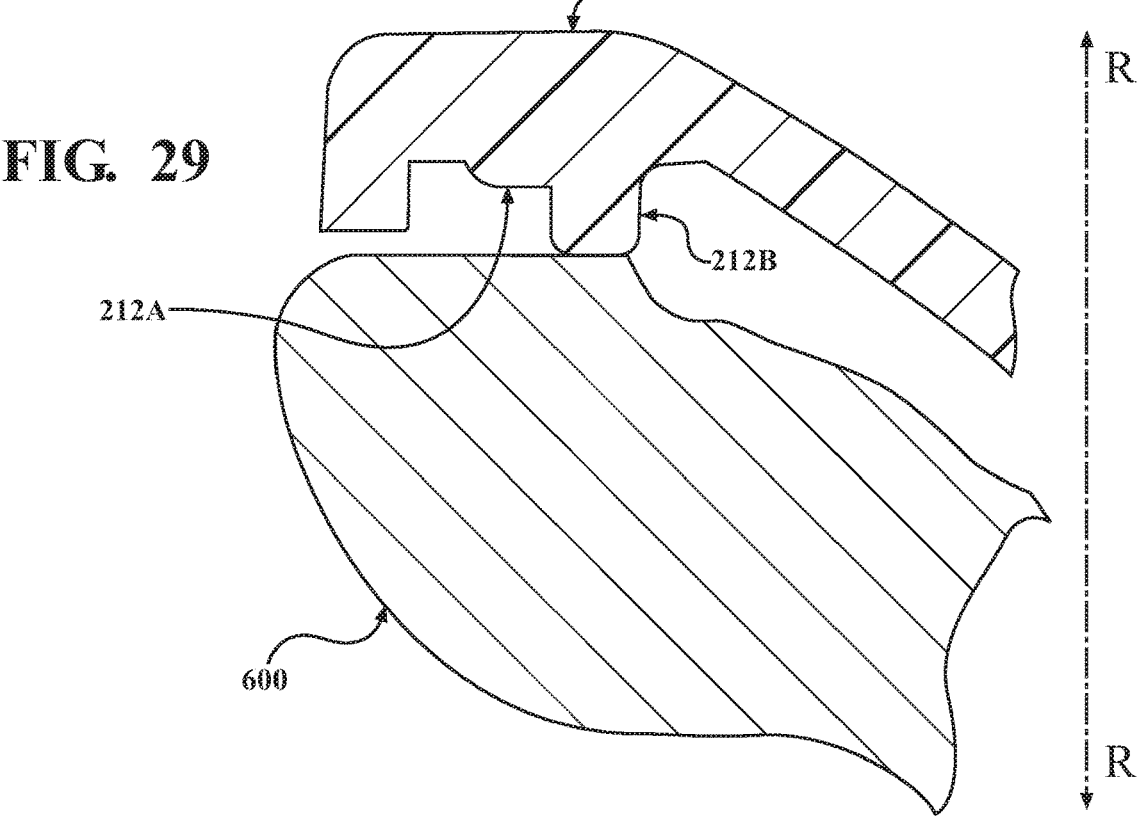
FIG. 29 is a partial, cross-sectional view of the wheel taken through a non-recessed portion of the cover in an alternate embodiment in which the first and second structural supports are integrally formed and positioned in an alternate configuration.

Although shown as discrete structures that define a space 616 therebetween (e.g., a groove 618) in the embodiments seen in FIGS. 24-27, it is also envisioned that the supports 212A, 212B may be integrally (e.g., monolithically) formed so as to eliminate the space 616, as seen in FIGS. 28 and 29, which illustrate the first support 212A being positioned radially inward and radially outward of the second support 212B, respectively.

Figure 30:
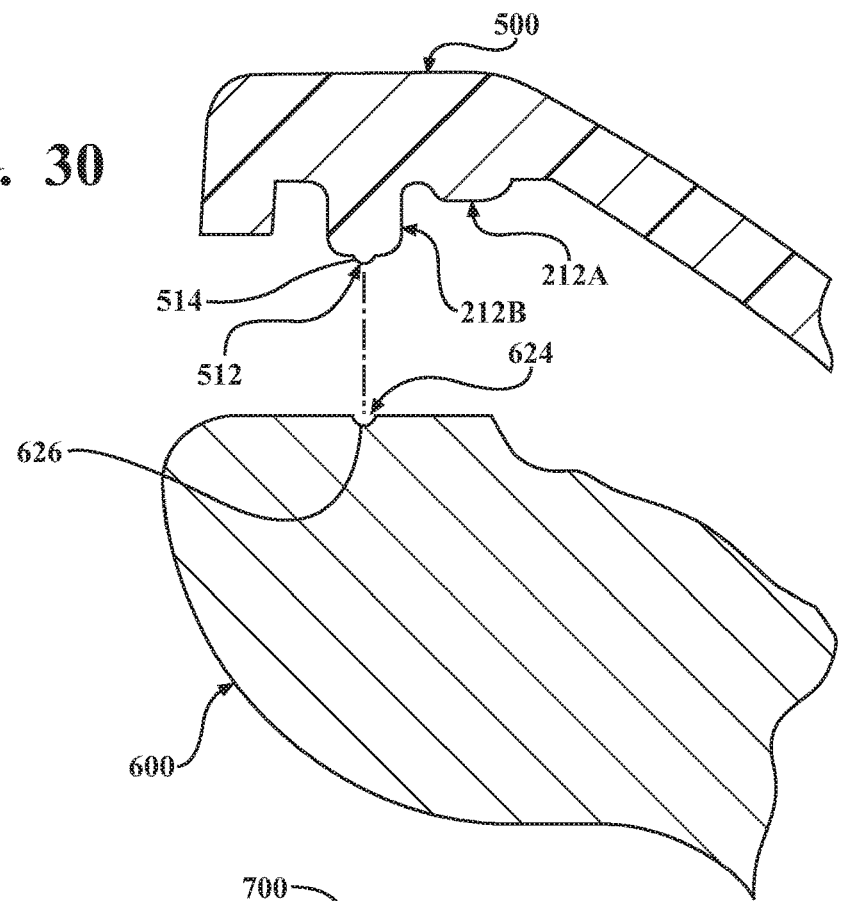
FIG. 30 is a partial, cross-sectional view of the wheel taken through a non-recessed portion of the cover in an alternate embodiment in which the cover and the backbone include corresponding alignment members.
Figure 31:
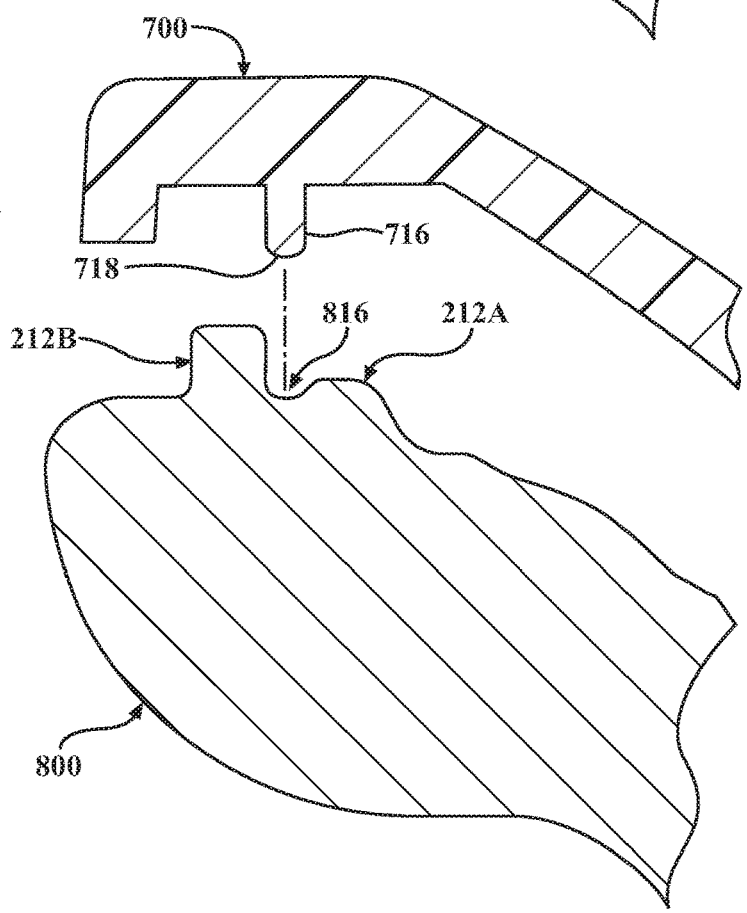
FIG. 31 is a partial, cross-sectional view of the wheel taken through a non-recessed portion of the cover in an alternate embodiment in which the first and second structural supports are included on the backbone so as to receive an extension included on the cover.
Figure 32:
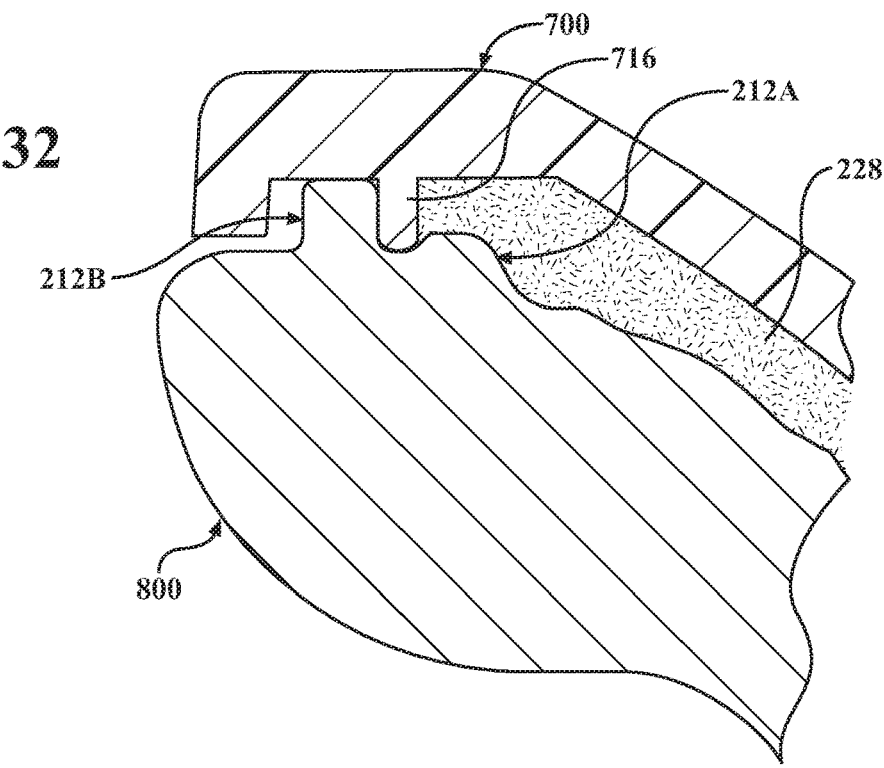
FIG. 32 is a partial, cross-sectional view of the cover and the backbone seen in FIG. 31 upon assembly.

To facilitate proper alignment between the cover 500 and the backbone 600, and assembly of the wheel 10, as discussed in connection with the embodiment of the disclosure seen in FIG. 12, it is envisioned that the cover 500 and the backbone 600 may include corresponding alignment members 512, 624 (FIG. 30). For example, as seen in FIG. 30, the cover 500 (e.g., the support 212A and/or the support 212B) may include one or more detents 514 that are configured for positioning in one or more corresponding recesses 626 defined in the backbone 600.

With reference now to FIGS. 31-34, another embodiment of the cover and the backbone, which are identified by the reference characters 700, 800, respectively, will be discussed. The cover 700 and the backbone 800 are substantially similar to those discussed in connection with the preceding embodiments, and, accordingly, will only be described with respect to any differences therefrom.

Figure 33:
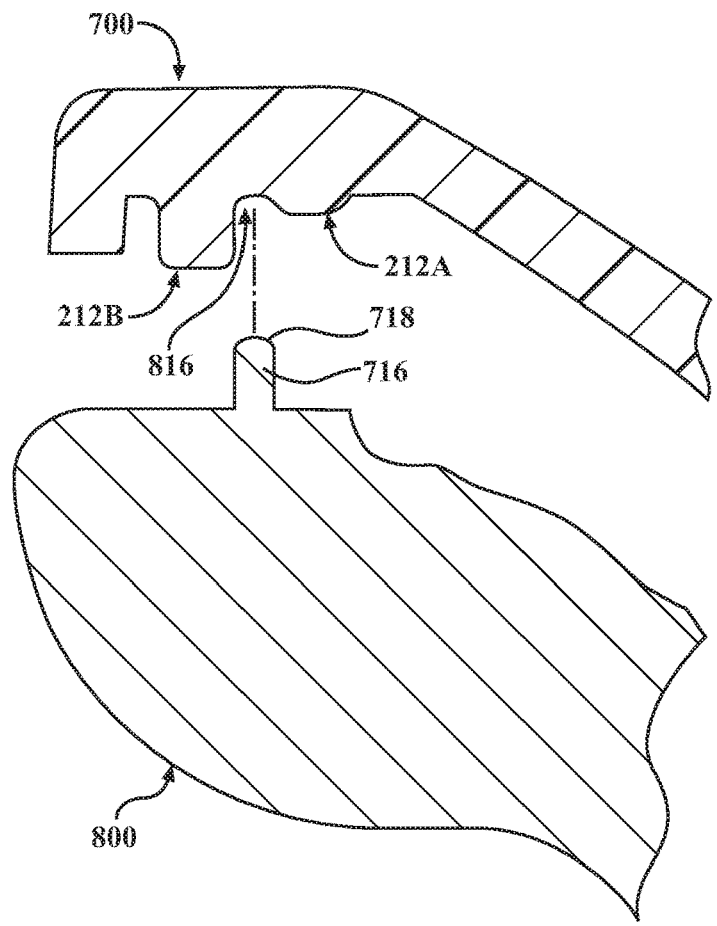
FIG. 33 is a partial, cross-sectional view of the wheel taken through a non-recessed portion of the cover in an alternate embodiment in which the first and second structural supports are included on the cover so as to receive an extension included on the backbone.
Figure 34:
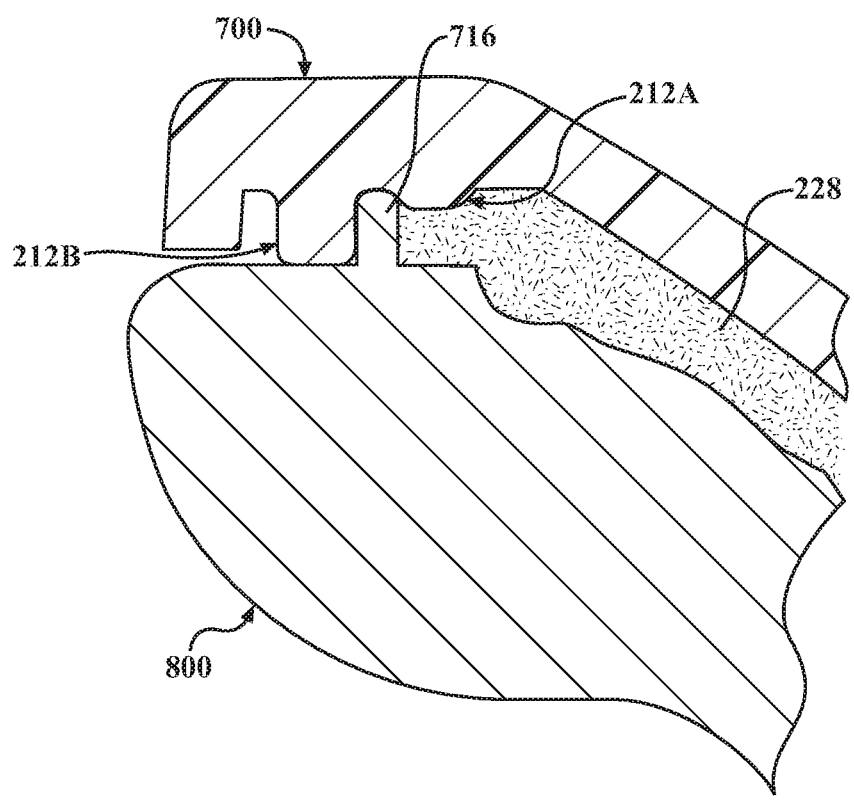
FIG. 34 is a partial, cross-sectional view of the cover and the backbone seen in FIG. 33 upon assembly.

The cover 700 and the backbone 800 include corresponding structures that are configured for nesting engagement. More specifically, in the embodiment illustrated in FIGS. 31 and 32, the cover 700 includes an extension 716 (e.g., a rib, detent, or the like) that is configured for receipt between the supports 212A, 212B provided on the backbone 800 (e.g., within the space 816 defined between the supports 212A, 212B). Although shown as being included on the cover 700 in the embodiment seen in FIGS. 31 and 32, in alternate embodiments, the extension 716 may be included on the backbone 800, as seen in FIGS. 33 and 34.

Positioning the extension 716 between the supports 212A, 212B may serve not only to enhance the connection between the cover 700 to the backbone 800, but to further inhibit leakage of the adherent 228 from the chamber(s) 230, and the extension 716 and the supports 212A, 212B may be configured in any manner suitable for these intended purposes. For example, the extension 716 may include an end portion 718 that is generally arcuate in configuration, as seen in FIGS. 31-34. Alternatively, it is envisioned that the end portion 718 may be generally planar or pointed (e.g., triangular) in configuration.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward,"

"downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle wheel, comprising:
a cover including recessed portions and non-recessed portions spaced about a periphery of the cover and located on an external surface thereof such that each of the recessed portions and the non-recessed portions are located at substantially similar distances from an axis of rotation of the vehicle wheel, the recessed and non-recessed portions defining inner surfaces; and
a backbone defining at least one first support configured and positioned for direct contact with the inner surfaces defined by the recessed portions and at least one second support configured and positioned for direct contact with the inner surfaces defined by the non-recessed portions such that the cover is entirely positioned laterally outward of the backbone along the axis of rotation of the vehicle wheel.

2. The vehicle wheel of claim 1, wherein the cover is formed from a non-metallic material and the backbone is formed from a metallic material, the at least one second support being positioned radially outward of the at least one first support, the at least one first support being configured as an annular rib and the at least one second support including a plurality of second supports formed as discrete structures, the annular rib and the plurality of second supports being formed as discrete structures, the annular rib defining a first thickness and the plurality of second supports each defining a second thickness greater than the first thickness.

3. The vehicle wheel of claim 1, wherein the at least one second support is positioned radially inward of the at least one first support.

4. The vehicle wheel of claim 1, wherein the at least one second support is positioned radially outward of the at least one first support.

5. The vehicle wheel of claim 1, wherein the at least one first support is configured as a rib and the at least one second support includes a plurality of second supports.

6. The vehicle wheel of claim 5, wherein the plurality of second supports are monolithically formed.

7. The vehicle wheel of claim 5, wherein the plurality of second supports are formed as discrete structures.

8. The vehicle wheel of claim 5, wherein the rib and the plurality of second supports are monolithically formed.

9. The vehicle wheel of claim 5, wherein the rib and the plurality of second supports are formed as discrete structures.

10. The vehicle wheel of claim 9, wherein the rib is spaced radially from the plurality of second supports so as to define a space therebetween.

11. The vehicle wheel of claim 10, wherein the rib defines a first thickness and the plurality of second supports each define a second thickness greater than the first thickness.

12. A backbone for a vehicle wheel, the backbone being configured to support a cover such that the cover is entirely positioned laterally outward of the backbone along an axis of rotation of the vehicle wheel, the backbone defining an outer rim including at least one first support defining a first thickness and at least one second support defining a second thickness different from the first thickness, the at least one first support and the at least one second support being configured and positioned for direct contact with the cover, wherein the at least one first support is configured as a rib and the at least one second support includes a plurality of second supports.

13. The backbone of claim 12, wherein the second thickness is greater than the first thickness.

14. The backbone of claim 12, wherein the plurality of second supports are positioned radially outward of the rib.

15. The backbone of claim 12, wherein the plurality of second supports are formed as discrete structures.

16. The backbone of claim 12, wherein the rib is spaced radially from the plurality of second supports so as to define a space therebetween.

17. A method of assembling a vehicle wheel, comprising:
positioning a cover adjacent a backbone of the vehicle wheel such that inner surfaces defined by recessed portions of the cover are in direct contact with a first support extending from an outer rim of the backbone, and inner surfaces defined by non-recessed portions of the cover are in direct contact with a second support extending from the outer rim, the recessed portions and the non-recessed portions being located on an external surface of the cover such that each of the recessed portions and the non-recessed portions are located at substantially similar distances from an axis of rotation of the vehicle wheel; and
securing the cover to the backbone.

18. The method of claim 17, wherein securing the cover to the backbone includes securing the cover to the backbone using an adherent.

19. The method of claim 18, wherein securing the cover to the backbone includes injecting the adherent into one or more spaces defined between the cover and the backbone.

* * * * *